United States Patent
Feng et al.

(10) Patent No.: US 8,915,439 B2
(45) Date of Patent: Dec. 23, 2014

(54) LASER SCANNING MODULES EMBODYING SILICONE SCAN ELEMENT WITH TORSIONAL HINGES

(75) Inventors: Chen Feng, Snohomish, WA (US); Gregory Rueblinger, Stratford, NJ (US); Ynjiun Paul Wang, Cupertino, CA (US)

(73) Assignee: Metrologic Instruments, Inc., Blackwood, NJ (US)

( * ) Notice: Subject to any disclaimer, the term of this patent is extended or adjusted under 35 U.S.C. 154(b) by 214 days.

(21) Appl. No.: 13/367,047

(22) Filed: Feb. 6, 2012

(65) Prior Publication Data

US 2013/0200158 A1   Aug. 8, 2013

(51) Int. Cl.
*G06K 19/00* (2006.01)
(52) U.S. Cl.
USPC ....... 235/462.01; 235/435; 235/439; 235/454
(58) Field of Classification Search
USPC .......................................................... 235/462
See application file for complete search history.

(56) References Cited

U.S. PATENT DOCUMENTS

| | | | |
|---|---|---|---|
| 3,020,414 A | 2/1962 | Mcknight et al. | |
| 3,087,373 A | 4/1963 | Poor et al. | |
| 3,532,408 A | 10/1970 | Dostal | |
| 3,642,344 A | 2/1972 | Corker | |
| 4,034,230 A | 7/1977 | Brill et al. | |
| 4,251,798 A | 2/1981 | Swartz et al. | |
| 4,286,145 A | 8/1981 | Palmer | |
| 4,805,175 A | 2/1989 | Knowles | |
| 4,856,858 A | 8/1989 | Koike et al. | |
| 5,003,164 A | 3/1991 | Barkan | |

(Continued)

FOREIGN PATENT DOCUMENTS

| JP | 2003315713 A | 11/2003 |
|---|---|---|
| WO | 2011038072 A | 3/2011 |

OTHER PUBLICATIONS

Gerald F. Marshall (editor), Laser Beam Scanning—Optical Engineering Series, vol. 8, Marcel Dekker, Inc., published Dec. 6, 1985, pp. 250 and 252.

(Continued)

*Primary Examiner* — Matthew Mikels
(74) *Attorney, Agent, or Firm* — Additon, Higgins & Pendleton, P.A.

(57) ABSTRACT

Laser scanning module employing a scan mirror and magnet rotor subassembly supported by a stationary stator structure. The scan mirror and magnet rotor subassembly includes: a silicone frame having a pair of silicone torsional hinges (i.e. posts) aligned along a scan axis and a supported by a pair of support elements associated with the stator structure, to support the scan mirror and magnet rotor subassembly. When the scan mirror and magnet rotor subassembly is rotated about its scan axis, by forces generated by an electromagnetic coil structure acting on the permanent magnet mounted on silicone frame, the silicone torsional hinges are elastically distorted and generate linear restoring forces which return the rotor subassembly back to its home position about the scan axis.

22 Claims, 65 Drawing Sheets

(56) References Cited

U.S. PATENT DOCUMENTS

| | | |
|---|---|---|
| 5,015,831 A | 5/1991 | Eastman et al. |
| 5,019,764 A | 5/1991 | Chang |
| 5,059,779 A | 10/1991 | Krichever et al. |
| 5,099,110 A | 3/1992 | Shepard et al. |
| 5,115,120 A | 5/1992 | Eastman |
| 5,126,545 A | 6/1992 | Barkan |
| 5,168,149 A | 12/1992 | Dvorkis et al. |
| 5,200,597 A | 4/1993 | Eastman et al. |
| 5,206,492 A | 4/1993 | Shepard et al. |
| 5,252,816 A | 10/1993 | Onimaru et al. |
| 5,258,699 A | 11/1993 | Grodevant |
| 5,262,627 A | 11/1993 | Shepard |
| 5,280,163 A | 1/1994 | Barkan |
| 5,280,165 A | 1/1994 | Dvorkis et al. |
| 5,281,801 A | 1/1994 | Shepard et al. |
| 5,329,103 A | 7/1994 | Rando |
| 5,367,151 A | 11/1994 | Dvorkis et al. |
| 5,373,148 A | 12/1994 | Dvorkis et al. |
| 5,412,198 A | 5/1995 | Dvorkis |
| 5,420,411 A | 5/1995 | Salatto, Jr. et al. |
| 5,422,469 A | 6/1995 | Bard et al. |
| 5,422,471 A | 6/1995 | Plesko |
| 5,422,472 A | 6/1995 | Tavislan et al. |
| 5,464,976 A | 11/1995 | Scofield et al. |
| 5,475,206 A | 12/1995 | Reddersen et al. |
| 5,479,000 A | 12/1995 | Dvorkis et al. |
| 5,484,995 A | 1/1996 | Scofield et al. |
| 5,486,944 A | 1/1996 | Bard et al. |
| 5,506,394 A | 4/1996 | Plesko |
| 5,508,503 A | 4/1996 | Scofield et al. |
| 5,512,744 A | 4/1996 | Scofield et al. |
| 5,519,198 A | 5/1996 | Plesko |
| 5,532,468 A | 7/1996 | Scofield |
| 5,532,480 A | 7/1996 | Scofield |
| 5,539,192 A | 7/1996 | Scofield et al. |
| 5,543,609 A | 8/1996 | Giordano et al. |
| 5,559,319 A | 9/1996 | Peng |
| 5,576,531 A | 11/1996 | Murphy |
| 5,581,067 A | 12/1996 | Grosfeld et al. |
| 5,581,070 A | 12/1996 | Dvorkis et al. |
| 5,583,332 A | 12/1996 | Krichever et al. |
| 5,589,679 A | 12/1996 | Dvorkis et al. |
| 5,594,232 A | 1/1997 | Giordano |
| 5,596,446 A | 1/1997 | Plesko |
| 5,598,070 A | 1/1997 | Coleman |
| 5,600,120 A | 2/1997 | Peng |
| 5,614,706 A | 3/1997 | Bard et al. |
| 5,621,371 A | 4/1997 | Dvorkis et al. |
| 5,625,483 A | 4/1997 | Swartz |
| 5,629,510 A | 5/1997 | Quinn et al. |
| 5,637,856 A | 6/1997 | Bridgelall et al. |
| 5,648,649 A | 7/1997 | Bridgelall et al. |
| 5,656,805 A | 8/1997 | Plesko |
| 5,668,362 A | 9/1997 | Plesko |
| 5,682,029 A | 10/1997 | Dvorkis et al. |
| 5,691,834 A | 11/1997 | Plesko |
| 5,693,929 A | 12/1997 | Dvorkis et al. |
| 5,698,835 A | 12/1997 | Dvorkis et al. |
| 5,705,799 A | 1/1998 | Li |
| 5,712,471 A | 1/1998 | Bremer |
| 5,714,750 A | 2/1998 | Eastman et al. |
| 5,723,851 A | 3/1998 | Salatto, Jr. et al. |
| 5,750,976 A | 5/1998 | Eastman et al. |
| 5,763,863 A | 6/1998 | Grosfeld et al. |
| 5,764,398 A | 6/1998 | Hayakawa |
| 5,786,585 A | 7/1998 | Eastman et al. |
| 5,796,222 A | 8/1998 | Grodevant |
| 5,804,809 A | 9/1998 | Eastman et al. |
| 5,821,521 A | 10/1998 | Bridgelall et al. |
| 5,825,013 A | 10/1998 | Dvorkis et al. |
| 5,866,894 A | 2/1999 | Bard et al. |
| 5,870,219 A | 2/1999 | Plesko |
| 5,874,720 A | 2/1999 | Dvorkis et al. |
| 5,880,452 A | 3/1999 | Plesko |
| 5,917,173 A | 6/1999 | Dvorkis et al. |
| 5,923,025 A | 7/1999 | Dvorkis et al. |
| 5,932,860 A | 8/1999 | Plesko |
| 5,945,658 A | 8/1999 | Salatto, Jr. et al. |
| 5,945,659 A | 8/1999 | Dvorkis et al. |
| 5,955,720 A | 9/1999 | He et al. |
| 5,984,188 A | 11/1999 | Dvorkis et al. |
| 6,056,200 A | 5/2000 | Dvorkis et al. |
| 6,059,188 A | 5/2000 | Difazio et al. |
| 6,102,294 A | 8/2000 | Swartz et al. |
| 6,114,712 A | 9/2000 | Dvorkis et al. |
| 6,129,282 A | 10/2000 | Reddersen |
| 6,142,379 A | 11/2000 | Bard et al. |
| 6,149,061 A | 11/2000 | Massieu et al. |
| 6,152,372 A | 11/2000 | Colley et al. |
| 6,173,895 B1 | 1/2001 | Plesko |
| 6,206,290 B1 | 3/2001 | Giebel et al. |
| 6,227,450 B1 | 5/2001 | Blake et al. |
| 6,230,976 B1 | 5/2001 | Sautter et al. |
| 6,283,372 B1 | 9/2001 | Li |
| 6,303,927 B1 | 10/2001 | Ahten et al. |
| 6,325,288 B1 | 12/2001 | Spitz |
| 6,328,216 B1 | 12/2001 | Colley et al. |
| 6,332,576 B1 | 12/2001 | Colley et al. |
| 6,334,573 B1 | 1/2002 | Li et al. |
| 6,347,744 B1 | 2/2002 | Metlitsky |
| 6,348,773 B1 | 2/2002 | Dvorkis et al. |
| 6,360,949 B1 | 3/2002 | Shepard et al. |
| 6,390,370 B1 | 5/2002 | Plesko |
| 6,439,461 B2 | 8/2002 | Dvorkis et al. |
| 6,491,222 B1 | 12/2002 | Dvorkis et al. |
| 6,527,180 B1 | 3/2003 | Dvorkis et al. |
| 6,527,183 B2 | 3/2003 | Bard et al. |
| 6,540,145 B2 | 4/2003 | Gurevich et al. |
| 6,575,370 B1 | 6/2003 | Dvorkis et al. |
| 6,585,160 B2 | 7/2003 | Dvorkis et al. |
| 6,592,040 B2 | 7/2003 | Barkan et al. |
| 6,607,132 B1 | 8/2003 | Dvorkis et al. |
| 6,612,192 B2 | 9/2003 | Hardy et al. |
| 6,612,496 B1 | 9/2003 | Barkan et al. |
| 6,621,070 B2 | 9/2003 | Ahten et al. |
| 6,637,657 B2 | 10/2003 | Barkan et al. |
| 6,641,043 B1 | 11/2003 | Plesko |
| 6,641,044 B2 | 11/2003 | Plesko |
| 6,648,227 B2 | 11/2003 | Swartz et al. |
| 6,651,888 B1 | 11/2003 | Gurevich et al. |
| 6,657,765 B2 | 12/2003 | Hayashi et al. |
| 6,712,270 B2 | 3/2004 | Leach |
| 6,715,681 B2 | 4/2004 | Dvorkis |
| 6,722,566 B1 | 4/2004 | Drzymala et al. |
| 6,729,545 B2 | 5/2004 | Li et al. |
| 6,769,616 B2 | 8/2004 | Fu et al. |
| 6,775,077 B1 | 8/2004 | Feng |
| 6,817,529 B2 | 11/2004 | Barkan et al. |
| 6,874,689 B2 | 4/2005 | Blake et al. |
| 6,884,993 B2 | 4/2005 | Ahten et al. |
| 6,900,918 B2 | 5/2005 | Orcutt et al. |
| 6,929,184 B2 | 8/2005 | Barkan |
| 6,932,274 B2 | 8/2005 | Dvorkis |
| 6,949,996 B2 | 9/2005 | Matsumoto et al. |
| 6,969,005 B2 | 11/2005 | Otsubo |
| 6,989,614 B2 | 1/2006 | Mizoguchi et al. |
| 7,034,370 B2 | 4/2006 | Kuo |
| 7,059,528 B2 | 6/2006 | Barkan et al. |
| 7,071,931 B2 | 7/2006 | Tegreene et al. |
| 7,182,262 B2 | 2/2007 | Wood et al. |
| 7,184,187 B2 | 2/2007 | Cannon et al. |
| 7,204,424 B2 | 4/2007 | Yavid et al. |
| 7,207,489 B2 | 4/2007 | Drzymala et al. |
| 7,246,375 B1 | 7/2007 | Jean et al. |
| 7,281,658 B2 | 10/2007 | Shepard et al. |
| 7,296,750 B2 | 11/2007 | Wood et al. |
| 7,306,154 B2 | 12/2007 | Takahashi |
| 7,325,736 B2 | 2/2008 | Asai et al. |
| 7,379,221 B2 | 5/2008 | Saito |
| 7,387,248 B2 | 6/2008 | Drzymala et al. |
| 7,416,126 B2 | 8/2008 | Wittenberg et al. |
| 7,420,721 B2 | 9/2008 | Takeuchi |
| 7,441,705 B2 | 10/2008 | Shepard et al. |
| 7,614,561 B2 | 11/2009 | Blake et al. |

(56) References Cited

U.S. PATENT DOCUMENTS

| | | | |
|---|---|---|---|
| 7,667,723 | B2 | 2/2010 | Cannon et al. |
| 8,059,324 | B2 | 11/2011 | Edmonds |
| 2004/0179254 | A1 | 9/2004 | Lewis et al. |
| 2006/0169780 | A1* | 8/2006 | Drzymala et al. ....... 235/462.36 |

OTHER PUBLICATIONS

Product Specification Sheet for Sub-Miniature Scanner, Model SC-3, by Electro-Optical Products Corporation, Ridgewood, NY 11385, USA, Dec. 2012, http://www.eopc.com/sc3.html, (3 Pages).

Product Specification Sheet for Sub-Miniature Scanner, Model SC-5, by Electro-Optical Products Corporation, Ridgewood, NY 11385, USA, Dec. 2012, http://www.eopc.com/sc5.html, (3 Pages).

Oliveira et al., "Dynamic Analysis of Silicon Micromachined Double-Rotor Scanning Mirror", Journal of Brazilian Society of Mechanical Science and Engineering, Oct.-Dec. 2006, vol. XXVIII, No. 4/443.

GAP Technologies, Inc., 208 Elmwood Ave., Sharon Hill PA 19079, 610-586-1900; GAP Axial Scan Product Line: NANO 200A Scanner, SQ Scan Engine, NANO60A Scanner, Ultrapen, Next Generation Laser Scanning, Next Generation Bar Code Scanning. 11 Pages.

* cited by examiner

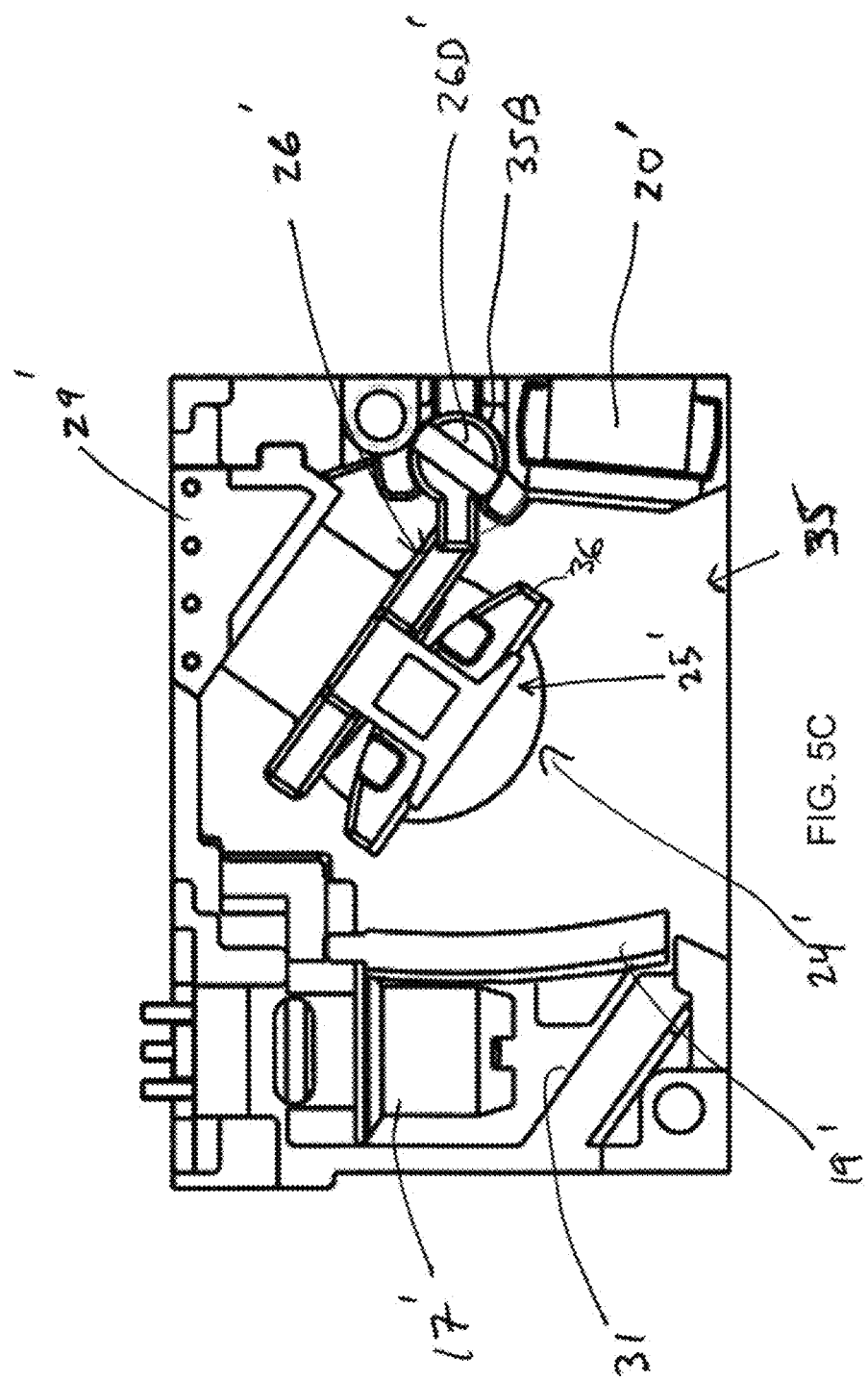

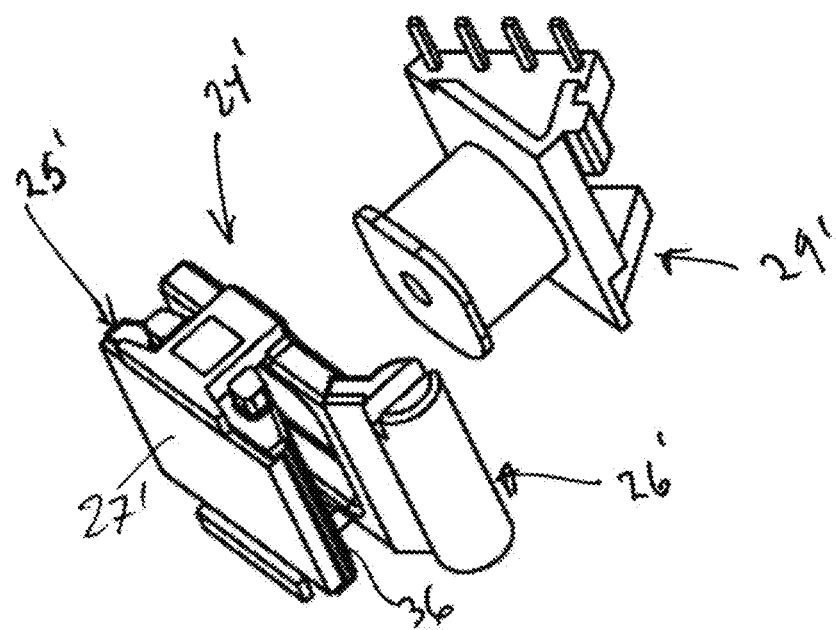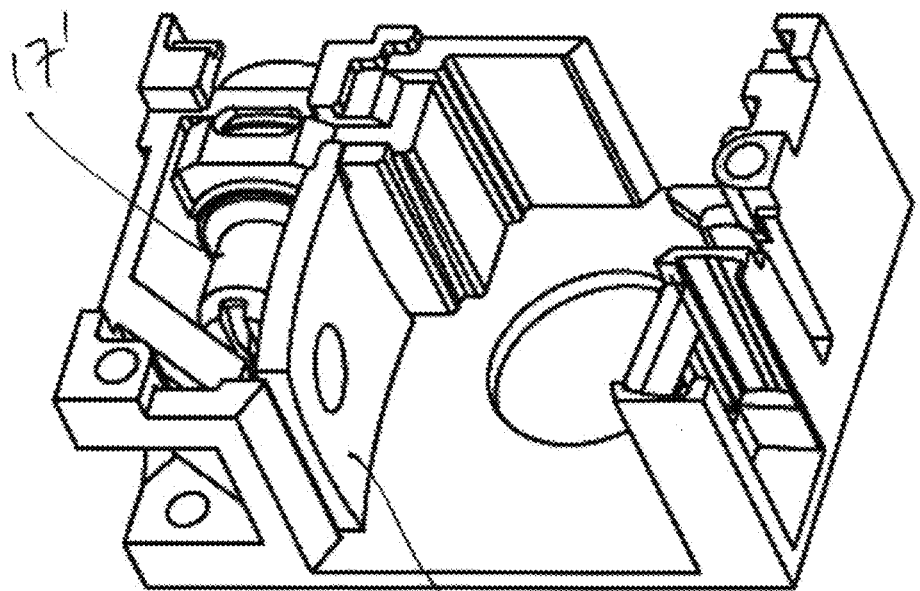
FIG. 6B

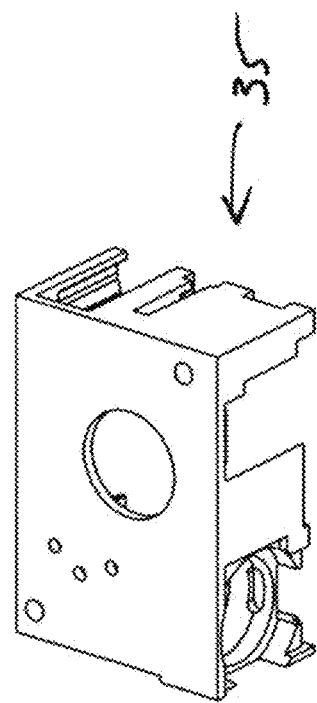
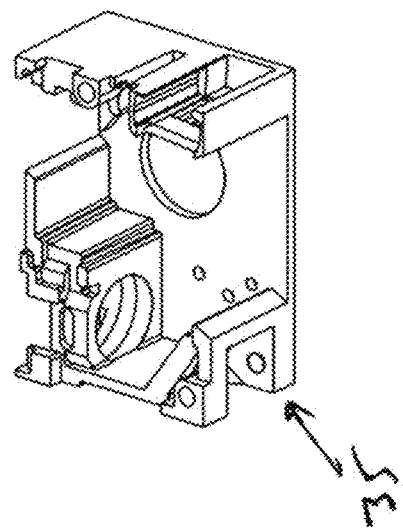
FIG. 7B
FIG. 7A

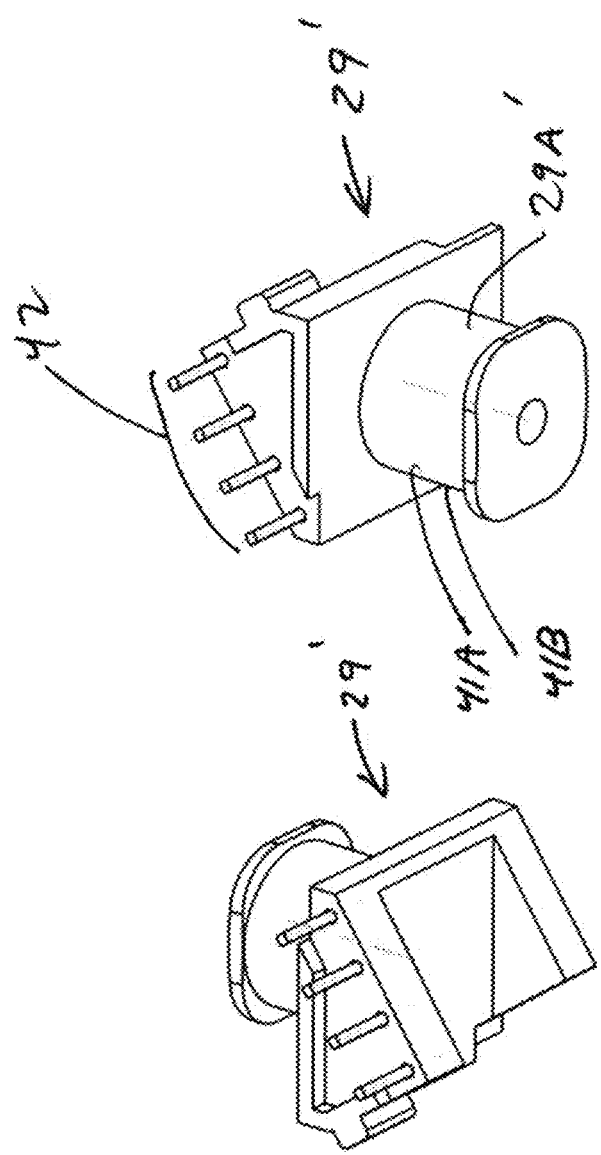

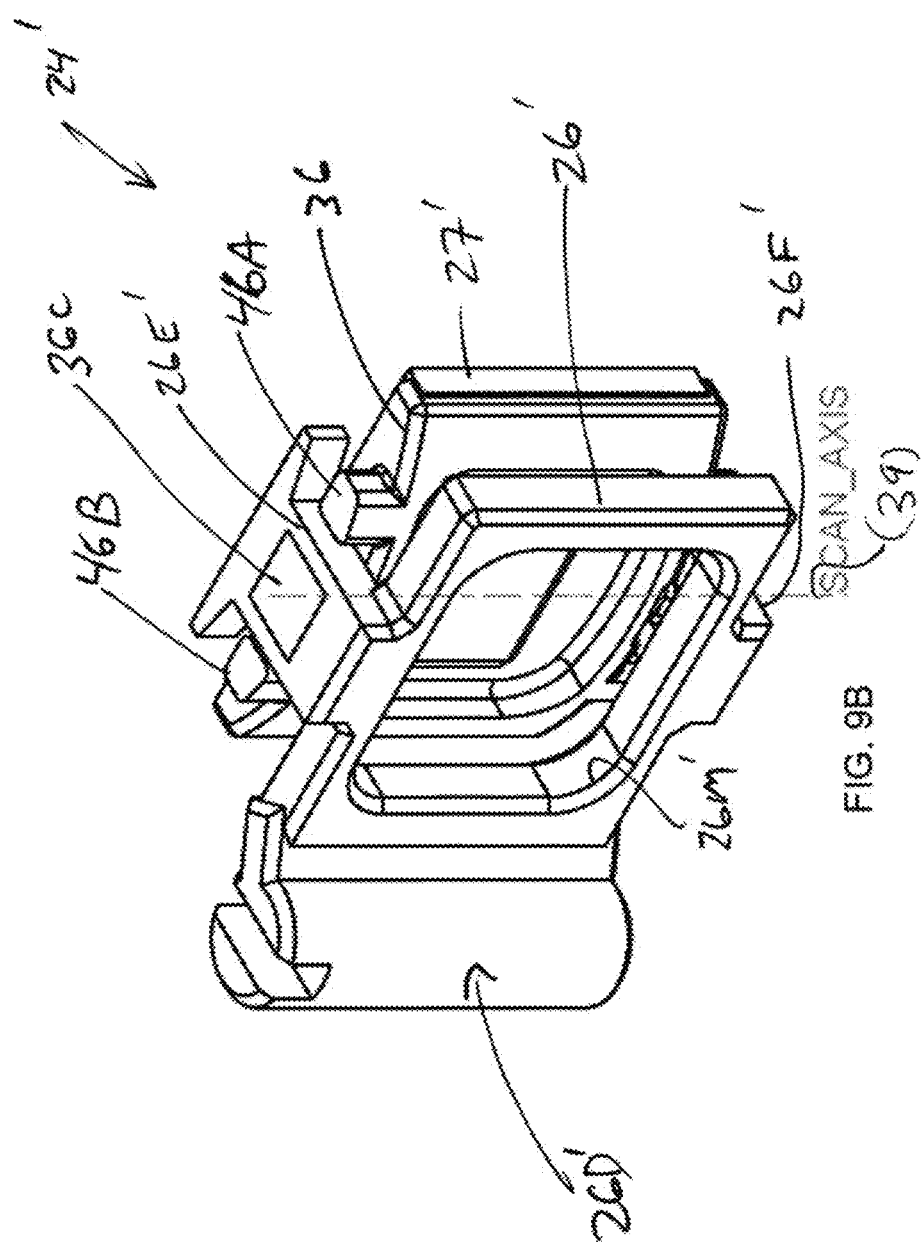

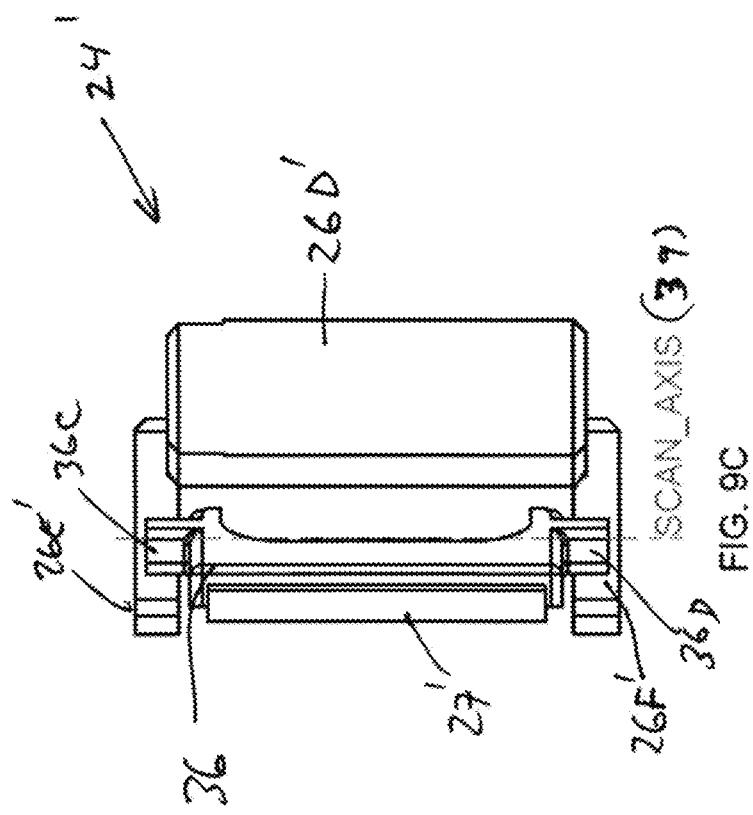

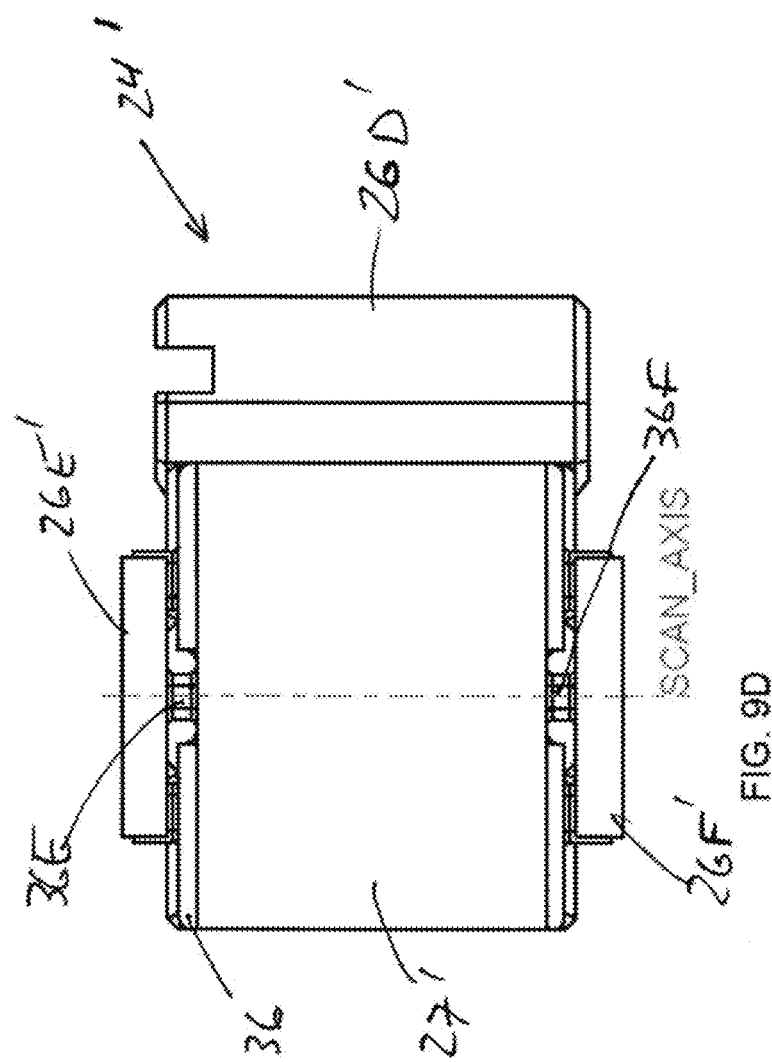

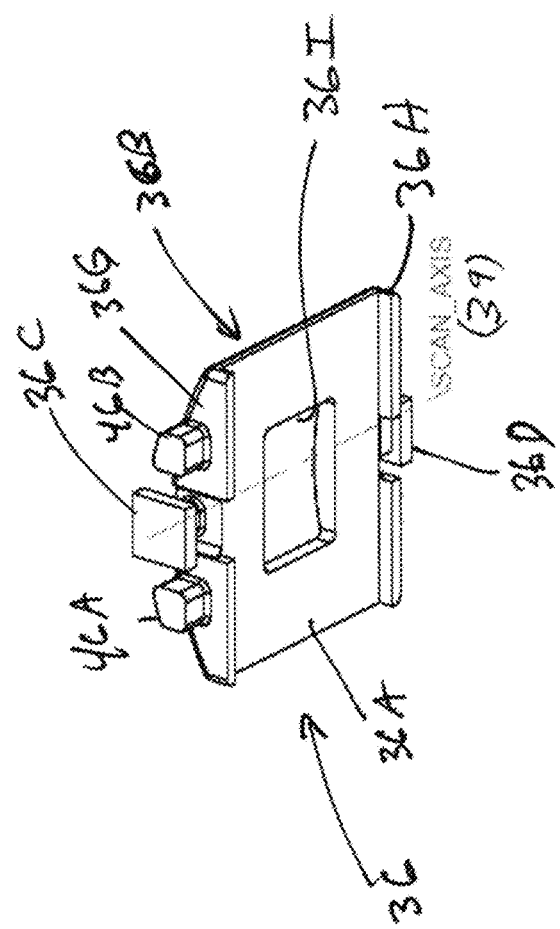

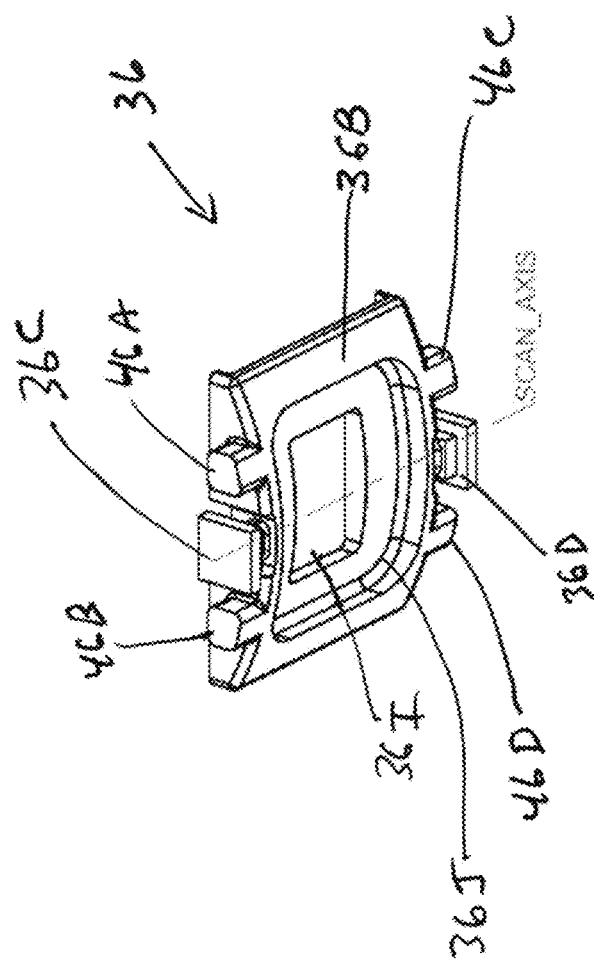

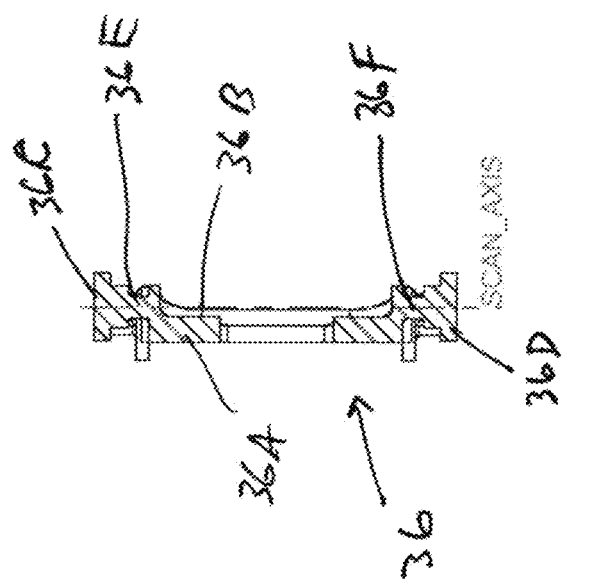

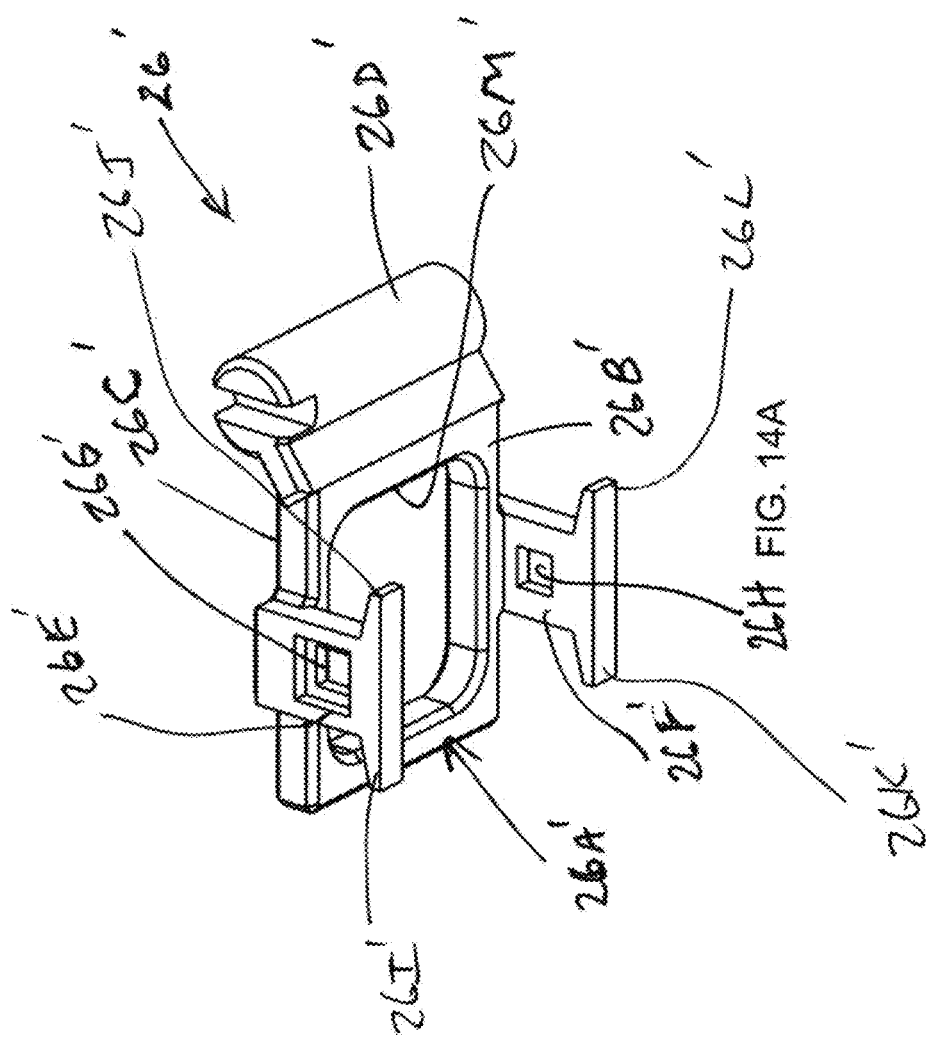

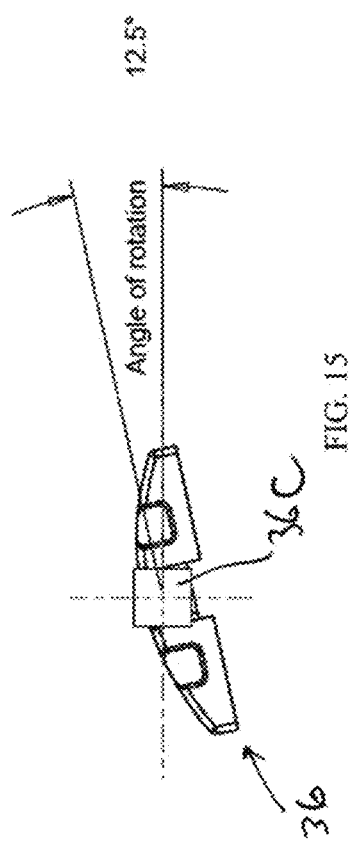

MAXIMAL LIMIT OF ELASTICALLY-DISTORTED
TORSIONAL HINGES THAT GENERATE A RESTORING/
RETURNING FORCE ON THE ROTOR

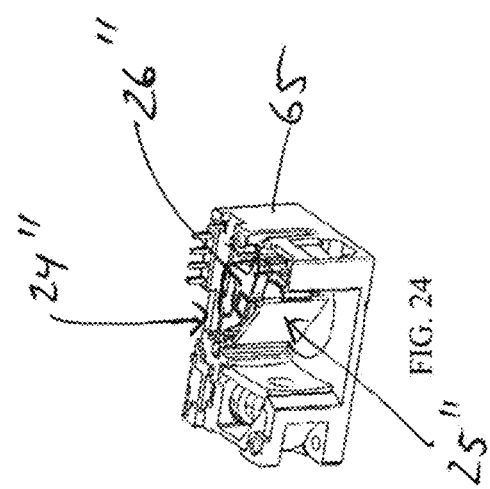

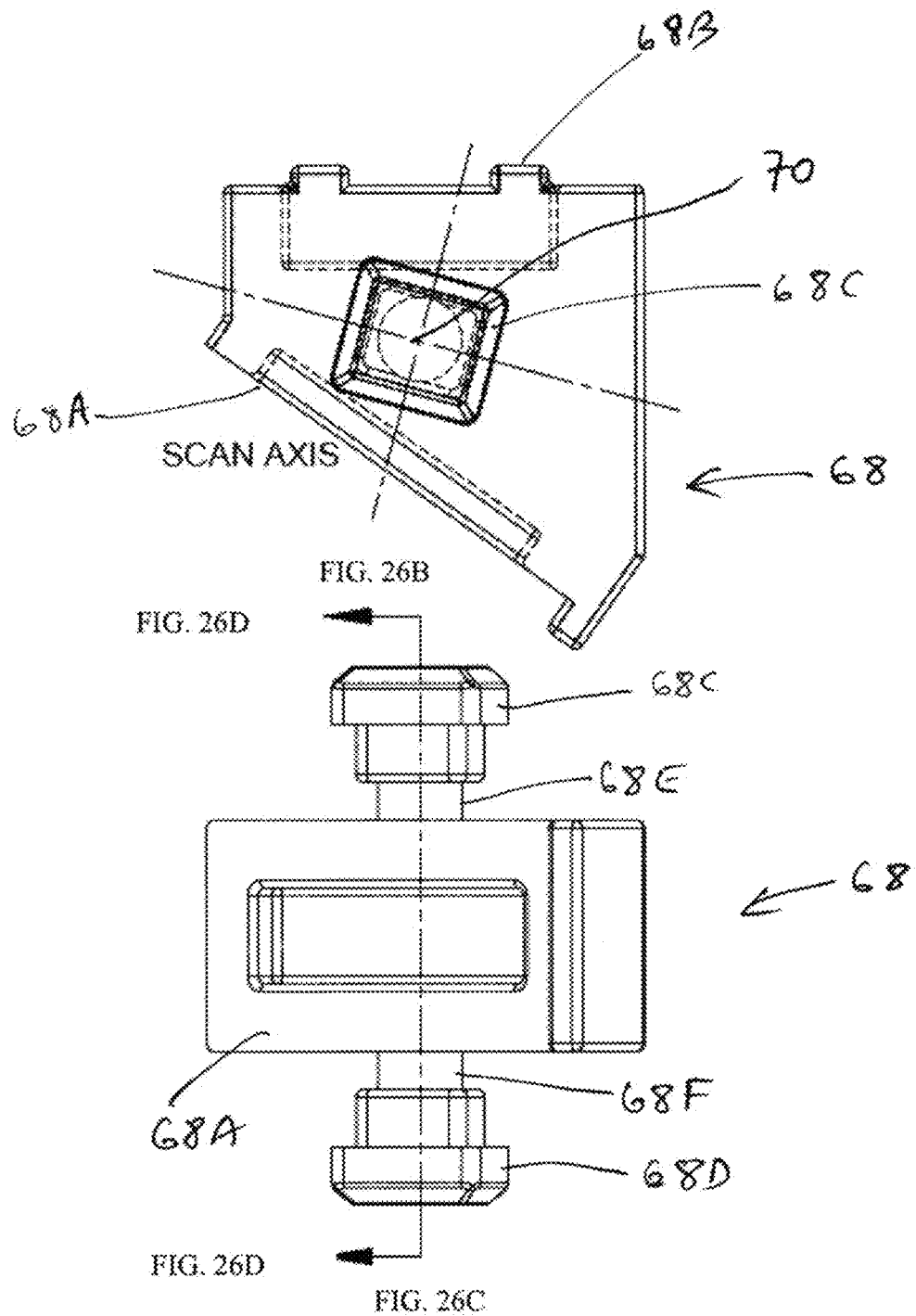

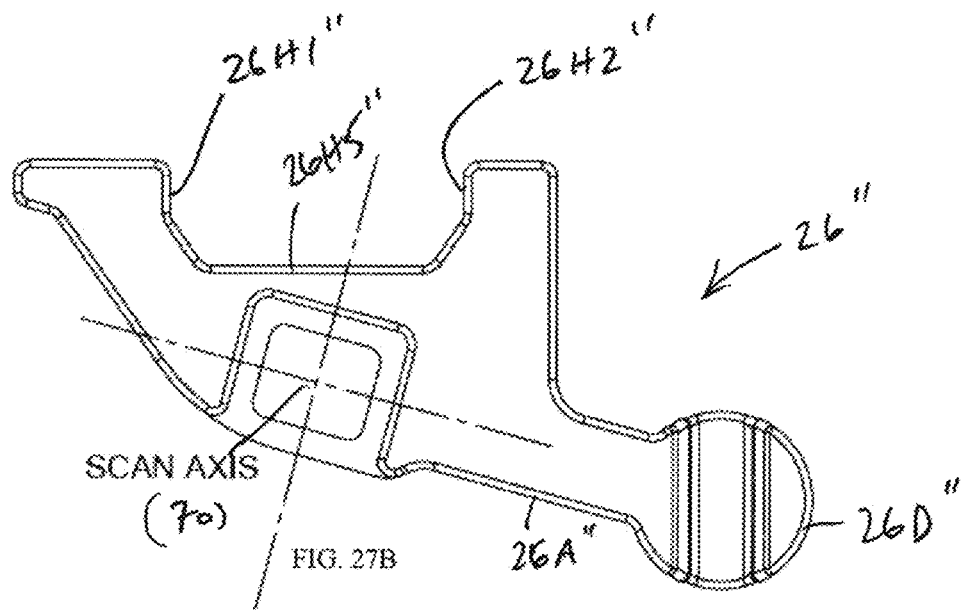
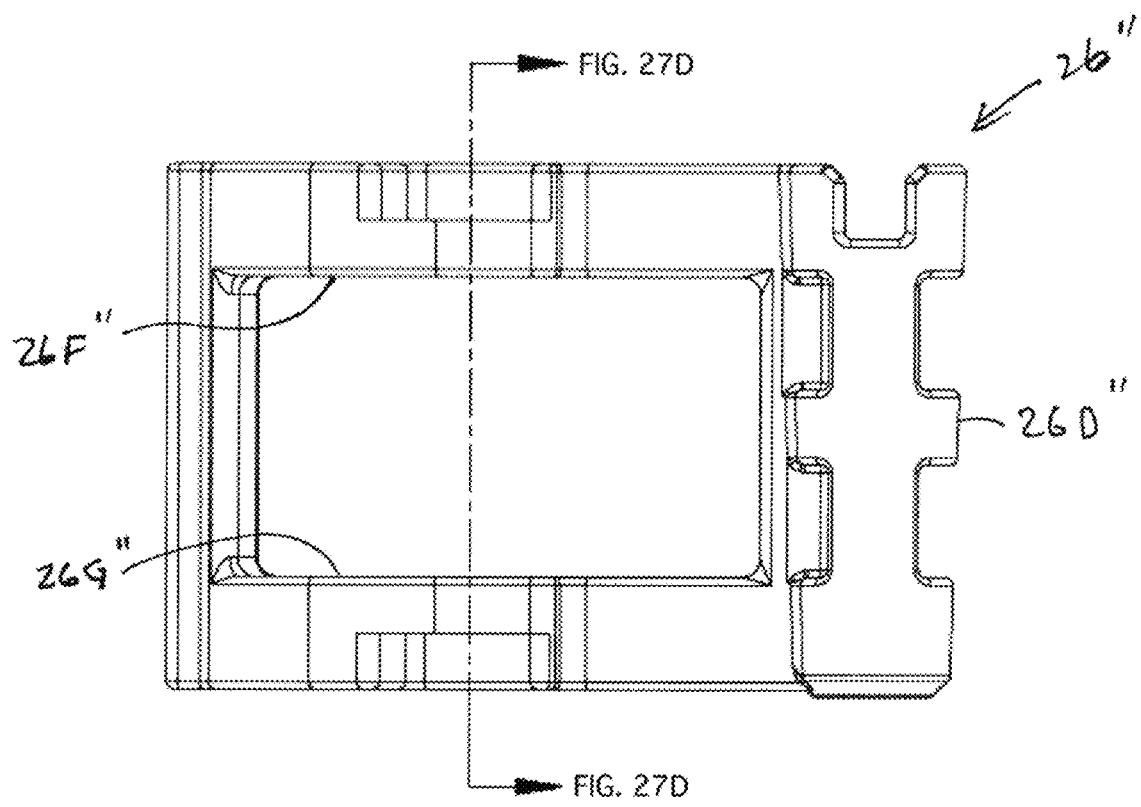
FIG. 27C

Scan Mirror Stop Position:
20 Degrees from Home Position

Scan Mirror Stop Position:
20 Degrees from Home

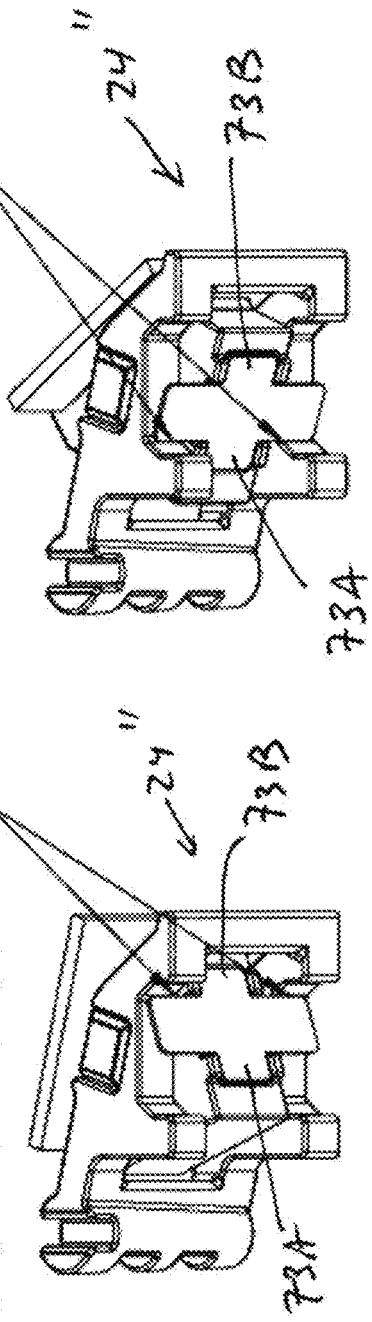

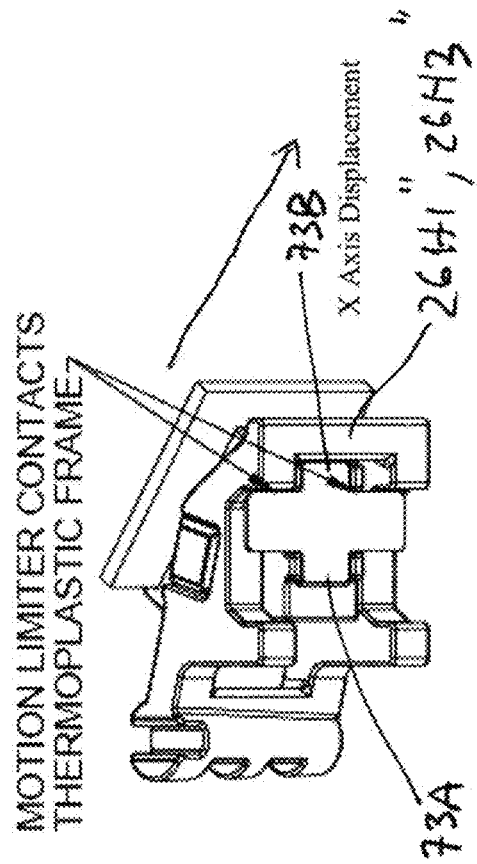

Y Axis Direction

Y Axis Displacement

Y Axis Direction

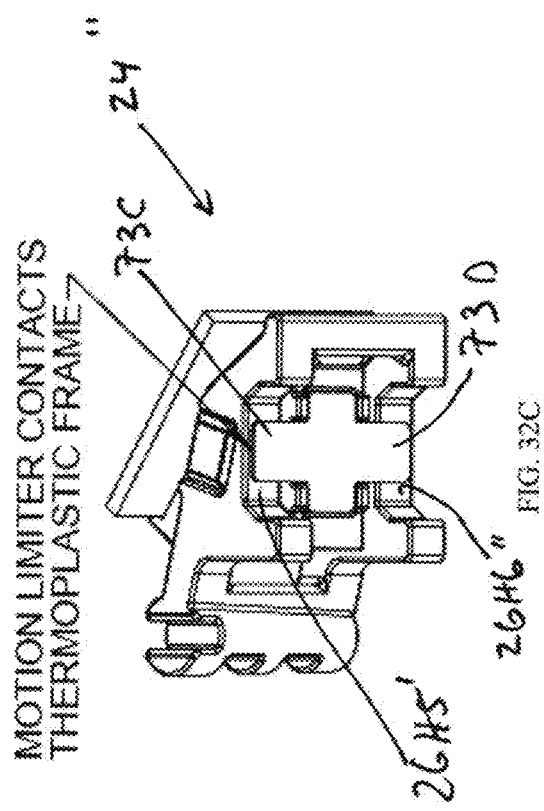

LASER SCANNING MODULES EMBODYING SILICONE SCAN ELEMENT WITH TORSIONAL HINGES

BACKGROUND OF DISCLOSURE

1. Field of Disclosure

The present disclosure relates to improvements in laser scanning modules, and more particularly to improvements in laser scanning assemblies employed therein.

2. Brief Description of the State of the Art

The use of laser scanning bar code symbol reading engines is well known in the art. Applications include: hand-held products; reverse-vending machines; and the like.

Currently, various types of laser scanning mechanisms have been developed for scanning laser beams across bar code symbols. Such laser scanning mechanisms include shaft-based laser scanning mechanisms; hinge-based laser scanning mechanisms; torsional-based laser scanning mechanisms; and flipper-based laser scanning mechanisms.

Conventional shaft-based scanning mechanisms suffer from a number of shortcomings and drawbacks. In particular, prior art shaft-based scanning assemblies suffer from friction-related uncertainty and reliability problems. When using a magnet to generate the return force, the resonant laser scanning system becomes unstable when subjected to excessive external forces.

Conventional silicone hinge-based laser scanning assemblies suffer from scan motion imprecision, due to the fact that such prior art scanning assemblies do not have a fixed scanning axis. Consequently, mirror scan mirror motion does not undergo perfect rotation, and thus, scan beam motion does not follow near ideal linear scanning motion. Also, when subjected to high G forces, additional motion limiters are required to prevent excessive motion. However, these extra motion limiters add complexity to the final laser scanning assembly.

Also, in conventional silicone hinge-based laser scanning assemblies, the moving part (i.e. rotor structure) which holds the scan mirror and permanent magnet is typically a subassembly of flexible and rigid parts, made from materials such as silicone and thermoplastic, or silicone and copper.

Conventional flipper-based laser scanning mechanisms, used generate scan lines in a laser based barcode scanner, also suffer from a number of shortcomings and drawbacks. In particular, stability of such laser scanning mechanisms directly affects the performance of the laser scanner.

Thus, there is great need in the art for new and improved laser scanning assemblies, which avoid the shortcomings and drawbacks of the prior art scanning methods and apparatus

OBJECTS AND SUMMARY

A primary object of the present disclosure is to provide a new and improved laser scanning element and module, which overcomes the shortcomings and drawbacks of the prior art laser scanning methods and apparatus.

Another object is to provide a laser scanning assembly employing a silicone frame having two narrow neck areas (e.g. having circular or rectangular cross-sectional dimensions), and functioning as torsion posts, to form a virtual axis about which a scan mirror and permanent magnet on a rotor subassembly are rotated, to create scanning motion similar to that supported by conventional shaft-based laser scanning mechanism, but without the shortcomings and drawbacks associated therewith.

Another object is to provide such a laser scanning assembly, wherein the silicone frame ensures symmetric resonant oscillation.

Another object is to provide such a laser scanning assembly, wherein the torsion posts in the silicone frame function as springs which generate returning forces to the scan mirror and magnet rotor subassembly, when the rotor subassembly is rotated about the virtual scan axis by forces generated by an electromagnetic coil structure and acting on the permanent magnet supported on the rotor subassembly.

Another object is to provide such a laser scanning assembly, wherein the silicone frame and a stationary stator structure incorporated built-in (i.e. integrated) motion limiters that provide precise scan angle limiting, and high G-force motion limiting in all directions, and eliminate the need for external means for achieving motion limiting when subjected to external shock forces.

Another object is to provide such a laser scanning assembly, wherein the silicone rotor frame supports both the scan mirror and magnet on the same side of the virtual rotational axis of the scan mirror and magnet rotor subassembly, significantly simplifying the assembly process during manufacture.

Another object is to provide such a laser scanning assembly, wherein its silicone rotor frame can support a scan mirror implemented as a glass mirror or silicon wafer, to provide better scan mirror surface quality and thus enable longer scanning range operation without compromising system performance.

Another object is to provide a laser scanning engine having an improved torsional-based laser scanning assembly, which can be used to replace shaft-based laser scanning engines to provide more reliable laser scanning operation, with less power consumption, and without friction-uncertainty related jamming, or high power consumption related problems.

Another object is to provide an improved torsional-based laser scanning module having that can be easily integrated into all laser scanning products.

Another object is to provide an improved torsional-based laser scanning module employing a single-piece silicone rotor frame that minimizes the space requirements during module integration.

Another object is to provide an improved torsion-based laser scanning assembly that employs a stationary stator structure, secured to the scanning engine chassis/housing, while supporting (i.e. holding) its scan mirror and magnet rotor subassembly at a minimal distance from the electromagnetic coil structure, to allow lower levels of electrical current to drive the electromagnet coil structure and rotate the scan mirror and magnet rotor subassembly about its virtual axis of rotation, in an energy-efficient manner.

Another object of the present disclosure is to provide an improved torsion-based laser scanning module with a torsion-based laser scanning assembly having a scan mirror and magnet rotor subassembly utilizing a molded silicone rotor frame supporting a scan mirror and permanent magnet, and having torsional-hinges (i.e. torsional posts) aligned along a virtual axis of rotation, and molded over a thermoplastic stator frame that is mounted to the scanning engine housing or chassis.

Another object is to provide such a torsion-based laser scanning assembly, wherein its over-molded, silicone torsion posts function as springs that generate returning forces to the scan mirror and magnet rotor subassembly, when the rotor subassembly is rotated about its virtual axis of rotation, by forces generated by an electromagnetic coil structure and acting on the permanent magnet supported on the rotor subassembly, thereby maintaining a stable laser scanning line during in scanning operation.

Another object is to provide a laser scanning engine employing a torsion-based laser scanning assembly, with an over-molded silicone rotor frame that supports the scan mirror on one side of the virtual axis of rotation, and the permanent magnet on the other side thereof.

Another object is to provide such a torsion-based laser scanning module, wherein its over-molded silicone rotor frame will experience minimal performance degradation over time, by being less susceptible to outside contaminants and environmental conditions, and support more stable scanning operation, and simplify assembly and manufacture.

Another object is to provide a laser scanning engine employing a torsion-based laser scanning assembly, with an over-molded silicone rotor frame that minimizes part-to-part variation, thus providing a more consistent laser scanning line during operation.

Another object of the present invention is to provide a laser scanning module that can be used to replace conventional shaft-based laser scanning engines, with a silicone torsional-based engine that consumers less electrical power, and eliminates friction uncertainty related jams, and high-power consumption problems, and which can be implemented using a glass mirror or silicon wafer mirror to provide better scan mirror surface quality required to achieve long range scanning operation.

Another object of the present invention is to provide a new and improved laser scanning assembly and laser scanning module that allows easy integration into all laser scanning products, while minimizing the space requirements for such integration.

These and other objects will become apparent hereinafter and in the claims.

BRIEF DESCRIPTION OF THE DRAWINGS

In order to more fully understand the objects, the following detailed description of the illustrative embodiments should be read in conjunction with the accompanying drawings in which:

FIG. 5C is a plan view of the laser scanning module of the first illustrative embodiment shown in FIG. 4A, with its top printed circuit (PC) board removed;

FIG. 6B is a second partially exploded view of the laser scanning module of FIGS. 5A through 5C, showing its laser scanning mechanism exploded into its electromagnetic coil structure and laser scanning assembly;

FIG. 7A is a first top perspective view of the module housing employed in FIGS. 6A and 6B, with all components removed therefrom as shown;

FIG. 7B is a second bottom perspective view of the module housing employed in FIGS. 6A and 6B, with all components removed therefrom as shown;

FIG. 8A is a first rear perspective view of the electromagnetic coil structure employed in the laser scanning module of FIGS. 6A and 6B;

FIG. 8B is a second front perspective view of the electromagnetic coil structure employed in the laser scanning module of FIGS. 6A and 6B;

FIG. 9B is a rear perspective view of the laser scanning assembly of the first illustrative embodiment, shown fully assembled, but removed from its support recess in the module housing shown in FIGS. 6A and 6B;

FIG. 9C is an elevated side view of the laser scanning assembly of the first illustrative embodiment, shown fully assembled, but removed from its support recess within the module housing shown in FIGS. 6A and 6B;

FIG. 9D is an elevated front view of the laser scanning assembly of the first illustrative embodiment, shown fully assembled, but removed from its support within the module housing shown in FIGS. 6A and 6B;

FIG. 13A is a front perspective view of the silicone frame comprising (i) a silicone (injection-molded) frame portion have a recessed region for receiving the scan mirror and adhesive layer, (ii) a pair of torsional support hinges (i.e. torsional support posts) projecting from the top and bottom edges of the frame portion and arranged along the scanning axis (i.e. scan axis) of the laser scanning assembly, (iii) a magnet mounting recess formed within the central region of the rear side of the frame portion for mounting the permanent magnet therein, and (iv) a two pairs of stops formed at the top and bottom ends of the frame portion for limiting scanning element displacement when subjected to external shock forces;

FIG. 13B is a rear perspective view of the silicone frame of the present disclosure, shown comprising (i) the silicone (injection-molded) frame portion have a recessed region for receiving the scan mirror and adhesive, (ii) the pair of torsional support hinges (i.e. torsional support posts) arranged along the scanning axis of the laser scanning assembly, (iii) the magnet mounting recess formed within the central region of the frame portion for mounting the permanent magnet therein, and (iv) the two pairs of stops formed at the top and bottom ends of the frame portion for limiting scanning element displacement when subjected to external shock forces;

FIG. 13C is a cross-sectional view of the silicone frame in FIGS. 13A and 14B, taken along its vertical extent, through the scanning axis of the silicone frame;

FIG. 14A is a front perspective of the frame holder employed in the laser scanning assembly shown in FIGS. 9A through 9C, showing its front side, its cylindrical support member for supporting the frame holder within a cylindrical recess formed in the module housing, and its pair of support elements provided on the front side for torsionally-mounted silicone (injection-molded) frame, by its torsional hinges, shown in FIGS. 13A and 13B;

FIG. 15 is a plan view of the silicone illustrating its normal range of scan angle motion about the scan axis in the clockwise the counter-clockwise directions, while the elastically-distorted torsional hinges generate linear restoring/return forces on the scan mirror and magnet rotor subassembly, to return the same to the home position shown in FIG. 9E, during scanning operations;

FIG. 24 is a first perspective view of the laser scanning module of FIG. 23, with its top side PC board removed for purposes of illustration;

FIG. 26B is plan view of the silicone frame shown in FIG. 26A, showing its silicone hinges aligned along an axis of rotation (i.e. scan axis);

FIG. 26C is a first elevated side view of the silicone frame, shown in FIGS. 26A and 26B, and illustrating the torsional hinges aligned along the scan axis;

FIG. 27B is a plan view of the thermoplastic frame holder shown in FIG. 27A;

FIG. 27C is an elevated front view of the thermoplastic frame holder shown in FIGS. 27A and 27B;

FIG. 29E is a perspective view of the laser scanning assembly of FIG. 25A, as configured with its scan mirror and magnet rotor subassembly rotated to an extreme clockwise position, and showing the integrated motion limiter striking the thermoplastic frame holder, and limiting the rotation of the scan mirror and magnet rotor subassembly;

FIG. 29F is a perspective view of the laser scanning assembly of FIG. 25A, as configured with its scan mirror and magnet rotor subassembly rotated to an extreme counter-clockwise position, and showing the integrated motion limiter striking the thermoplastic frame holder, and limiting the rotation of the scan mirror and magnet rotor subassembly;

9

Figure 25B:
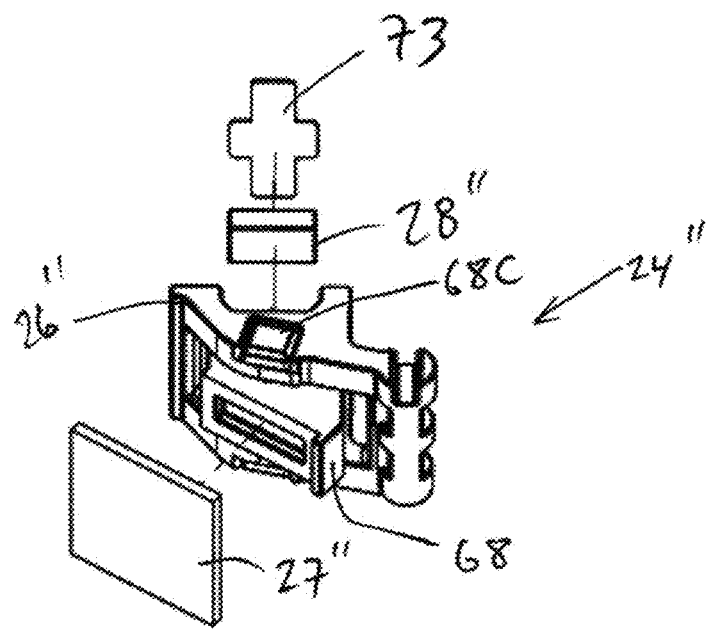
FIG. 25B is an exploded view of the laser scanning assembly of the second illustrative embodiment shown in FIG. 25A, with the scan mirror mounted on a front surface of the silicone frame, and permanent magnet mounted on a rear surface of the silicone frame.
Figure 25A:
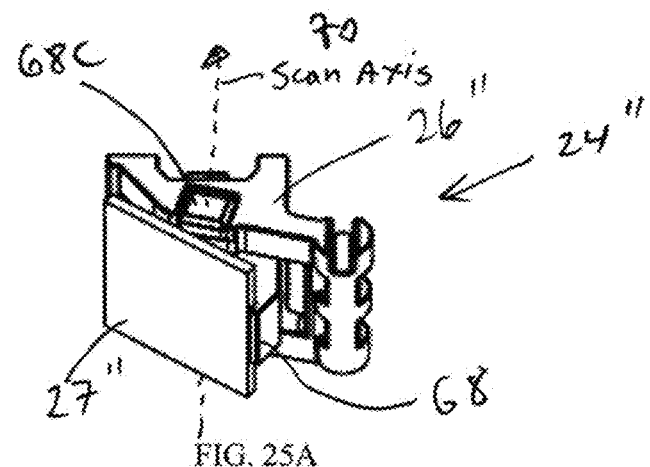
FIG. 25A is a first perspective view of the laser scanning assembly of the second illustrative embodiment comprising (i) a frame holder, (ii) a silicone frame having a scan mirror mounting surface, a magnet mounting surface and a pair of torsional silicone hinges (i.e. posts) connected to the frame holder by way of the silicone torsional hinges (i.e. hinge posts) aligned along an axis of rotation (i.e. scanning axis), (iii) scan mirror mounted to the scan mirror mounting surface, (iv) a magnet mounted to the magnet mounting surface, and (v) an omni-directional motion limiting structure mounted over the magnet on the rear side of the silicone frame.
Figure 25D:
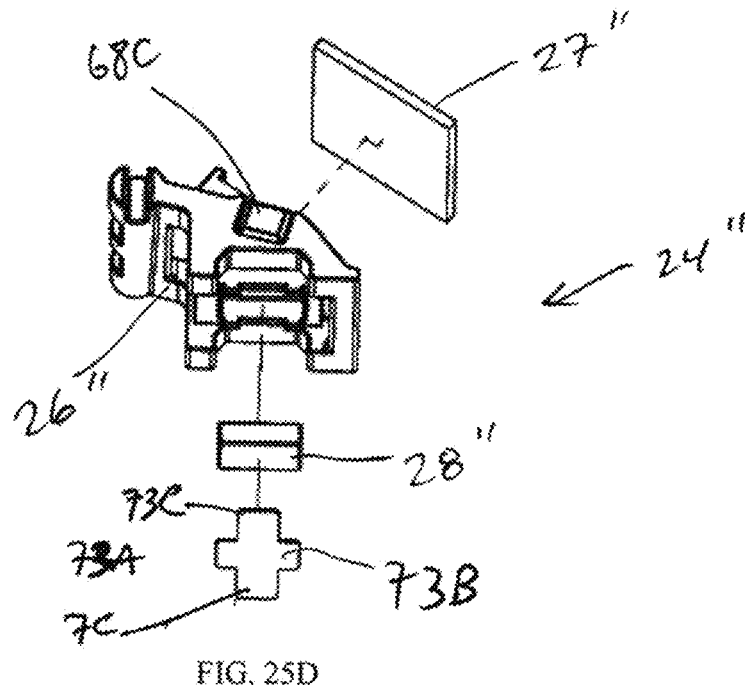
FIG. 25D is an exploded view of the laser scanning assembly shown in FIGS. 25A and 25C.
Figure 30B:
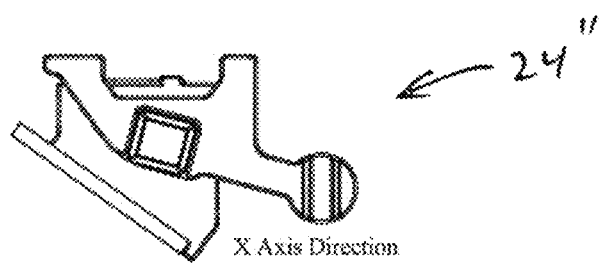
FIG. 30B is a plan view of the laser scanning assembly configured as shown in FIG. 30A.
Figure 30A:
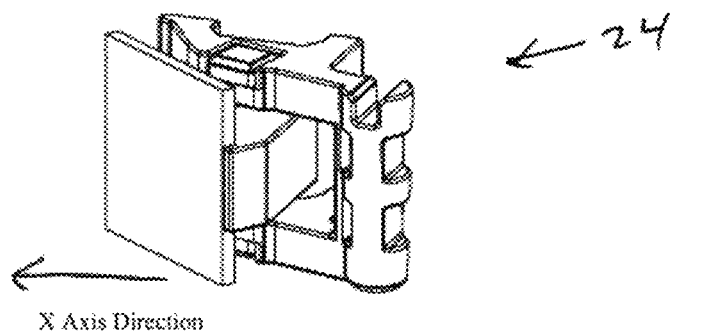
FIG. 30A is a perspective front view of the laser scanning assembly of FIG. 25A, subjected to external shock forces exceeding a particular threshold, with displacement of the scan mirror and magnet rotor subassembly limited along the x axis direction, by the integrated motion limiters.
Figure 30D:
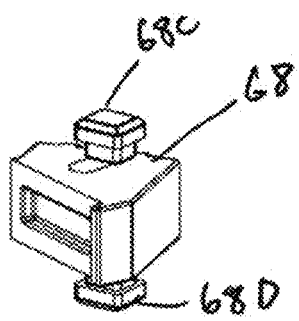
FIG. 30D is a perspective view of the silicone torsionally-supported frame in the configured laser scanning assembly of FIGS. 30A through 30C, showing the displacement of the silicone torsional hinges along the x axis direction.
Figure 30E:
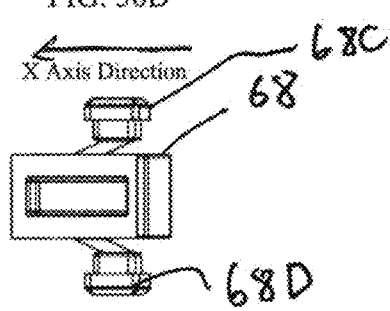
FIG. 30C is a perspective rear view of the laser scanning assembly of FIG. 25A, subjected to external shock forces exceeding a particular threshold, and showing the displacement of the scan mirror and magnet rotor subassembly limited along the x axis direction, by the integrated motion limiters contacting the thermoplastic frame holder, as shown.
Figure 31B:
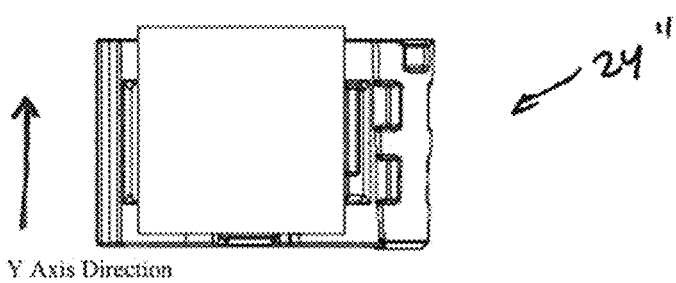
Figure 31A:
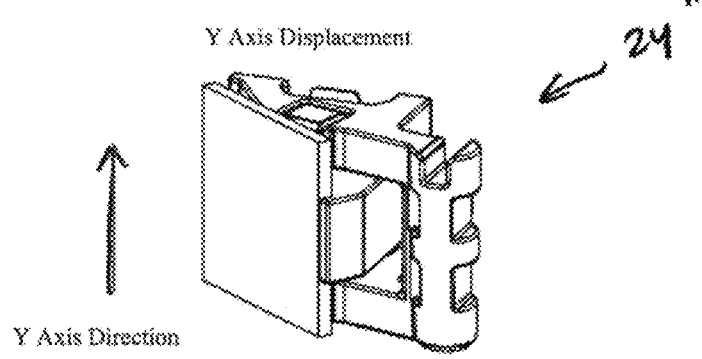
Figure 31C:
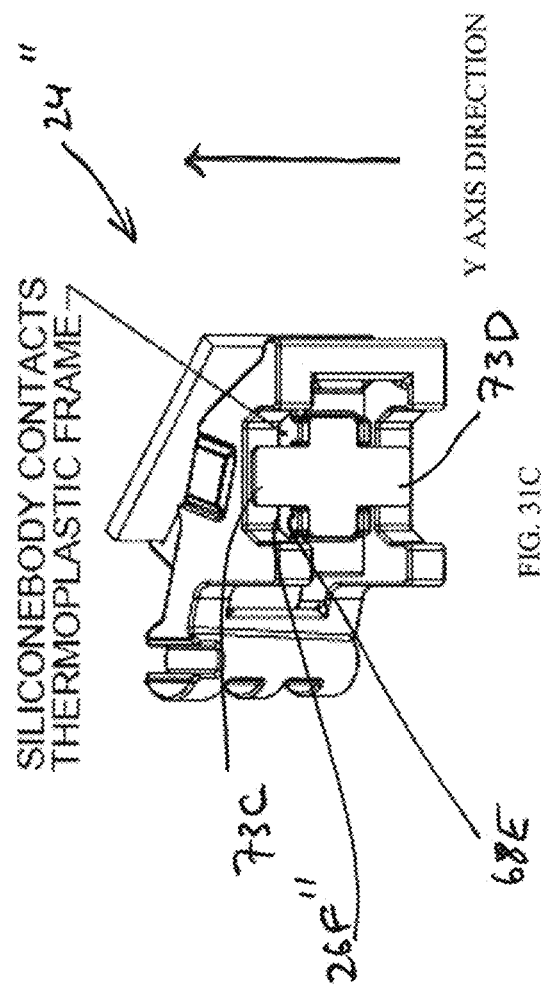
Figure 31D:
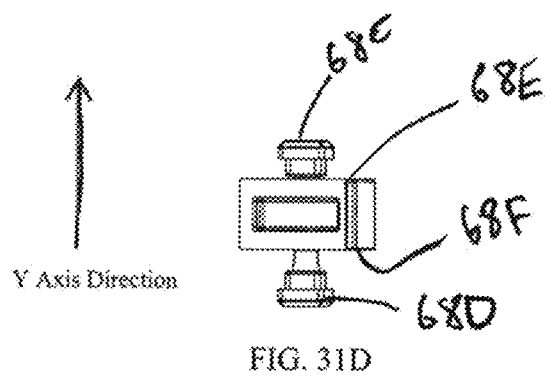
Figure 32B:
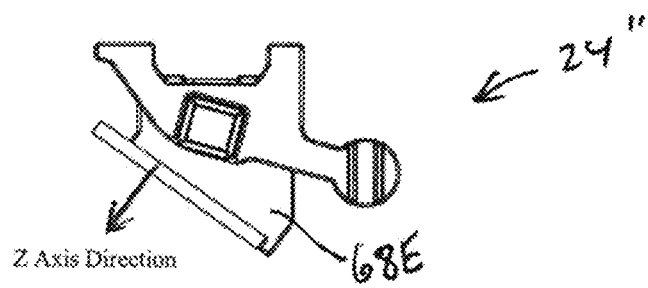
Figure 32A:
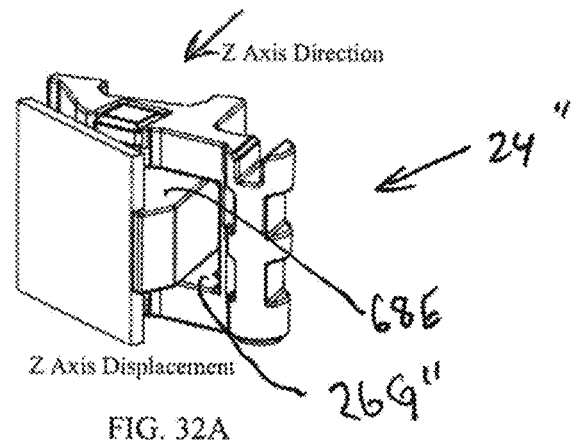
Figure 32D:
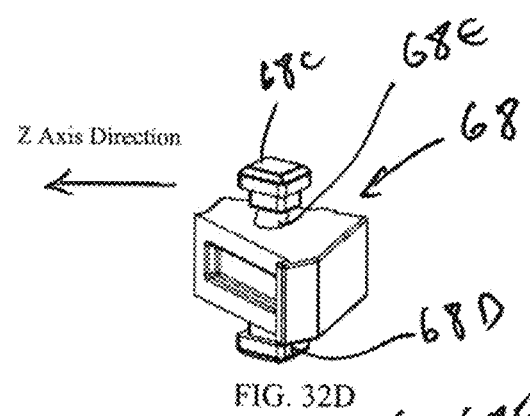
Figure 32E:
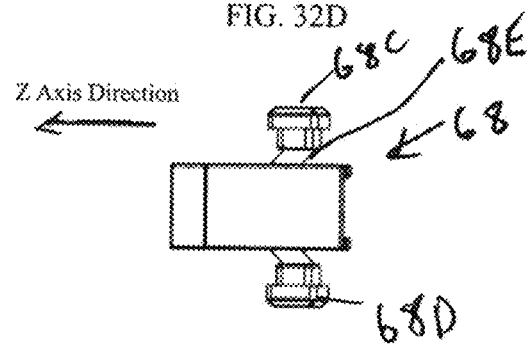

FIG. 30E is an elevated side view of the silicone torsionally-supported frame shown in FIG. 30D;

FIG. 31A is a perspective front view of the laser scanning assembly of FIG. 25A, subjected to external shock forces exceeding a particular threshold, with displacement of the scan mirror and magnet rotor subassembly limited along the y axis direction, by the integrated motion limiters;

FIG. 31B is an elevated side view of the laser scanning assembly configured as shown in FIG. 31A;

FIG. 31C is a perspective rear view of the laser scanning assembly of FIG. 25A, subjected to external shock forces exceeding a particular threshold, and showing the displacement of the scan mirror and magnet rotor subassembly limited along the y axis direction, by the integrated motion limiters contacting the thermoplastic frame holder, as shown;

FIG. 31D is a perspective view of the silicone torsionally-supported frame in the configured laser scanning assembly of FIGS. 31A through 31C, showing the displacement of the silicone torsional hinges along the y axis direction;

FIG. 32A is a perspective front view of the laser scanning assembly of FIG. 25A, subjected to external shock forces exceeding a particular threshold, with displacement of the scan mirror and magnet rotor subassembly limited along the z axis direction, by the integrated motion limiters;

FIG. 32B is a plan view of the laser scanning assembly configured as shown in FIG. 32A;

FIG. 32C is a perspective rear view of the laser scanning assembly of FIG. 25A, subjected to external shock forces exceeding a particular threshold, and showing the displacement of the scan mirror and magnet rotor subassembly limited along the z axis direction, by the integrated motion limiters contacting the thermoplastic frame holder, as shown;

FIG. 32D is a perspective view of the silicone torsionally-supported frame in the configured laser scanning assembly of FIGS. 32A through 32C, showing the displacement of the silicone torsional hinges along the z axis direction; and FIG. 32E is an elevated side view of the silicone torsionally-supported frame shown in FIG. 32D.

DETAILED DESCRIPTION OF THE ILLUSTRATIVE EMBODIMENTS

Referring to the figures in the accompanying drawings, the various illustrative embodiments of the present invention will be described in greater detail, wherein like elements will be indicated using like reference numerals.

Figure 1:
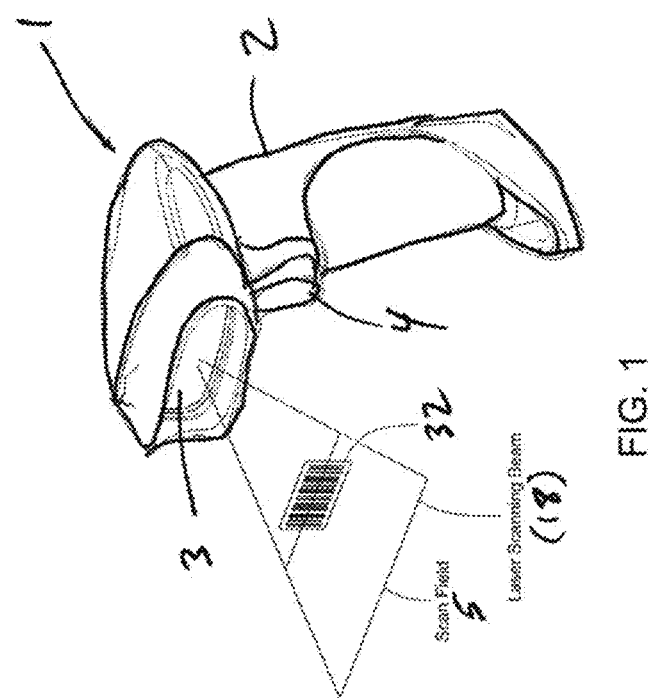
FIG. 1 is a hand-supportable laser scanning bar code symbol reading system, incorporating any one of the laser scanning modules of the illustrative embodiments of the present disclosure.

Overview On the Laser Scanning Module According to Principles of the Present Disclosure Laser scanning modules (i.e. engines) 30 and 60 are disclosed for use in diverse kinds of laser scanning bar code symbol reading systems 1 including, but not limited to, the hand-supportable laser scanning system 1 shown in FIG. 1. However, it is understood that these laser scanning modules 30 and 60 can be installed in other types of laser scanning systems, other than hand-supportable systems, such as POS-projection, countertop, and industrial type laser scanning systems.

Figure 2:
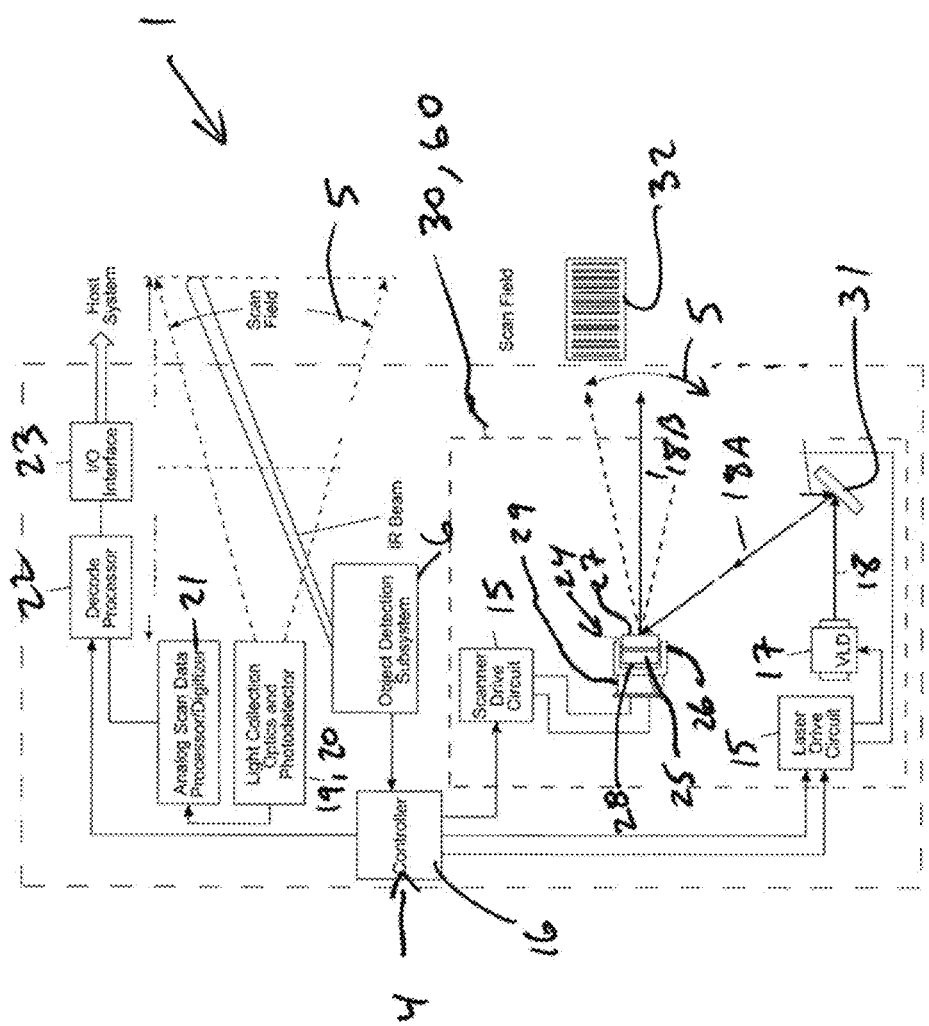
FIG. 2 is a schematic block diagram showing the system components employed in the laser scanning bar code symbol reading system of FIG. 1A, including the laser scanning engine of either the first illustrative embodiment shown in FIGS. 4A through 20C, or the second illustrative embodiment shown in FIGS. 21 through 26C.

As shown in FIGS. 1 and 2, the laser scanning bar code symbol reading system 1 comprises: a hand-supportable housing 2 having a head portion and a handle portion supporting the head portion; a light transmission window 3 integrated with the head portion of the housing 2; a manually-actuated trigger switch 4 for activating a laser scanning module or engine (e.g. as FIGS. 4A through 20C, or as shown in FIGS. 21 through 32E) supporting a laser scanning field 5; an IR-based object detection subsystem 6 for generating an IR beam within the laser scanning field, as shown in FIG. 2, for automatically detecting the presence of an object in the laser scanning field, and generating a trigger event signal when an object is automatically detected in the scanning field.

As shown in FIG. 2, the laser scanning module 30, 60 further comprises: a laser drive circuit 15 for receiving control signals from system controller 16, and in response thereto, generating and delivering laser (diode) drive current signals to a laser source 17 having beam shaping optics to produce a laser scanning beam 18 that is repeatedly scanned across the laser scanning field; light collection optics (e.g. light collection mirror) 19 for collecting light reflected/scattered from scanned object in the scanning field 5, and a photo-detector 20 for detecting the intensity of collected light and generating an analog scan data signal corresponding to the detected light intensity during scanning operations.

In the illustrative embodiment, the laser scanning module 30, 60 further comprises: an analog scan data signal processor/digitizer 21 for (i) processing the analog scan data signals, (ii) converting the processed analog scan data signals into digital scan data signals, and then (iii) converting these digital scan data signals into digital words representative of the relative width of the bars and spaces in the scanned code symbol structure; a programmed decode processor 22 for decode processing digitized data signals, and generating symbol character data representative of each bar code symbol scanned by either a visible or invisible laser scanning beam; an input/output (I/O) communication interface module 23 for interfacing with a host communication system and transmitting symbol character data thereto via wired or wireless communication links that are supported by the symbol reader and host system; and system (micro)controller 16 for generating the necessary control signals for controlling operations within the laser scanning bar code symbol reading system 1. Components 20, 21, 22 and 23 can be realized on one or more external PC boards, integrated with the laser scanning module 30, 60, or on an external PC boards interfaced with module 30, 60 using a flexible ribbon cable, in a manner well known in the art.

Preferably, IR-based object detection subsystem 6 is mounted in the front of its light transmission window 3 so that the IR light transmitter and IR light receiver components of subsystem 6 have an unobstructed view of an object within the laser scanning field of the system, as shown in FIG. 1. Also, the IR object presence detection module 6 can transmit into the scanning field 5, IR signals having a continuous low-intensity output level, or having a pulsed higher-intensity output level, which may be used under some conditions to increase the object detection range of the system. In alternative embodiments, the IR light transmitter and IR light receiver components can be realized as visible light (e.g. red light) transmitter and visible light (e.g. red light) receiver components, respectively, well known in the art. Typically the object detecting light beam will be modulated and synchronously detected, as taught in U.S. Pat. No. 5,340,971, incorporated herein by reference.

Depending on the application, the object detection subsystem 6 or the manually-actuated trigger switch 4 and related circuitry, can be enabled for the purpose of generating a trigger event signal and supporting either a manually-triggered mode of operation, or an automatically-triggered mode of operation, as required by the end-user application at hand.

Figure 10:
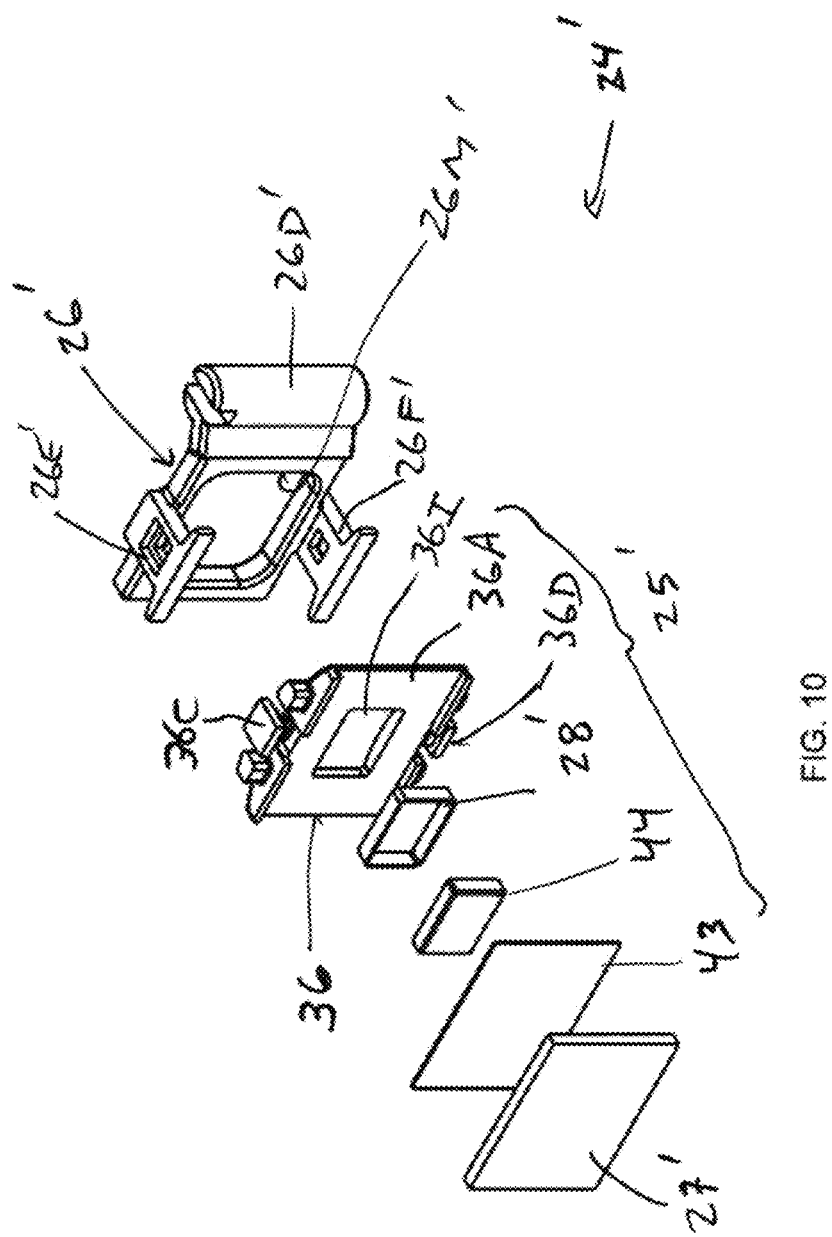
FIG. 10 is an exploded view of the laser scanning assembly shown in FIGS. 9A through 9E, comprising (i) a thermoplastic frame holder having a front side, a rear side, a support member for support within a cylindrical recess in the module housing, and a pair of support elements provided on the front side, (ii) a silicone frame structure having a pair of torsional hinges (i.e. torsional posts) for torsional mounting the silicone frame between the support elements provided on the front side of the frame holder, and integrated stop posts formed along the top and bottom edges of the silicone frame, (iii) a scan mirror and mirror adhesive for mounting the scan mirror to the front side of the silicone frame, and (iv) a thin permanent magnet and magnet adhesive for mounting the permanent magnet to rear side of the silicone frame.
Figure 11A:
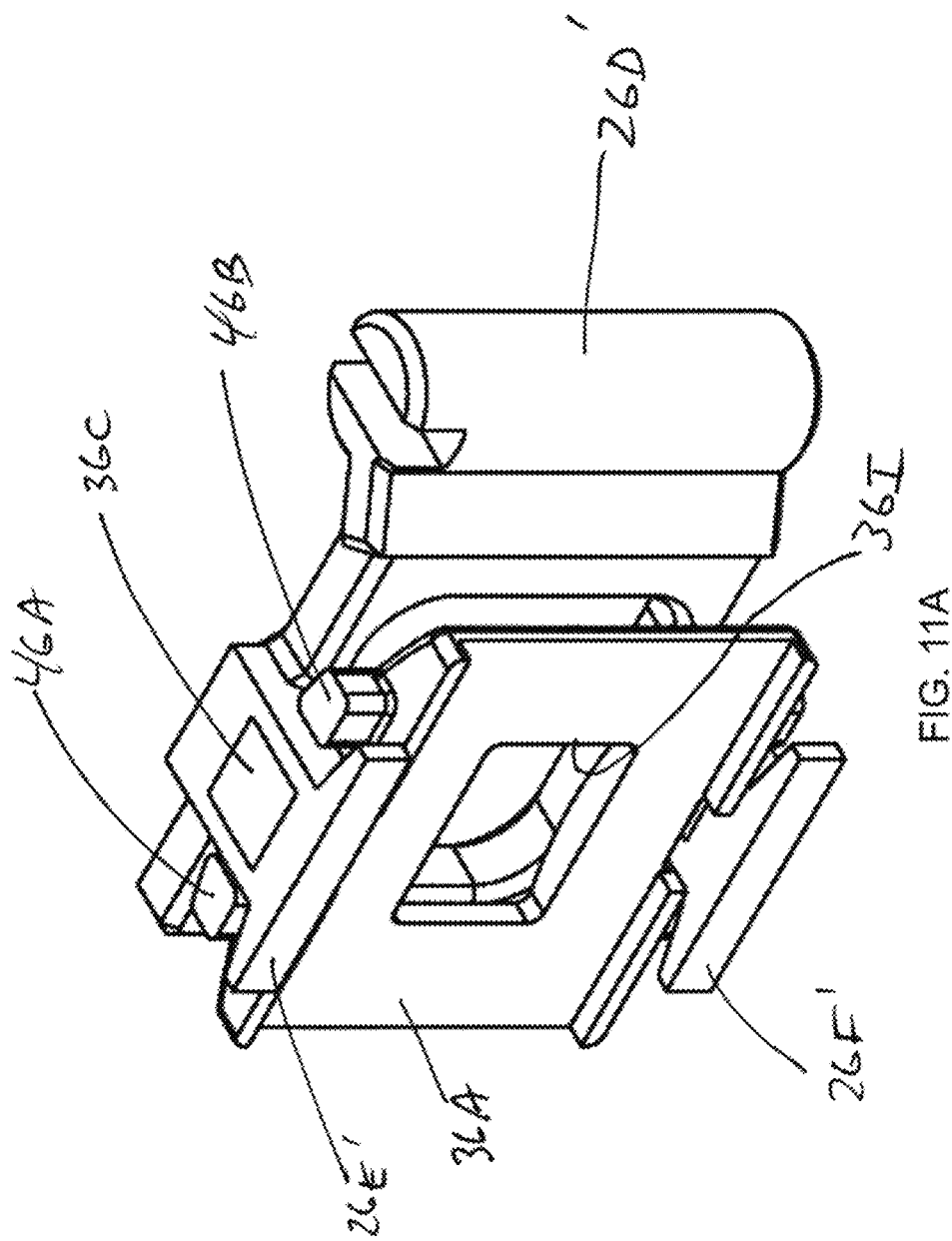
FIG. 11A is a first perspective view of the laser scanning assembly in FIGS. 9A through 9E, but with the scan mirror and magnet removed, while showing the frame holder and the silicone frame assembled together.
Figure 11B:
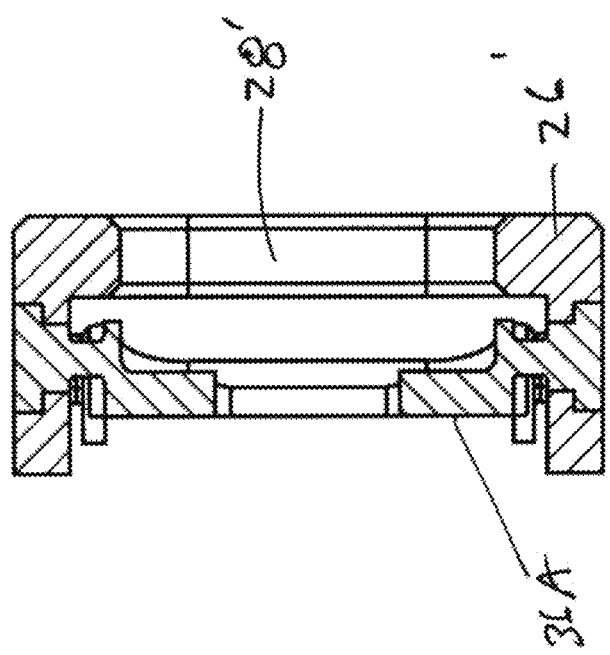
FIG. 11B is a cross-sectional view through the central portion of the laser scanning subassembly in FIG. 11A, with its permanent magnet mounted on the rear side of the silicone frame using adhesive.
Figure 12:
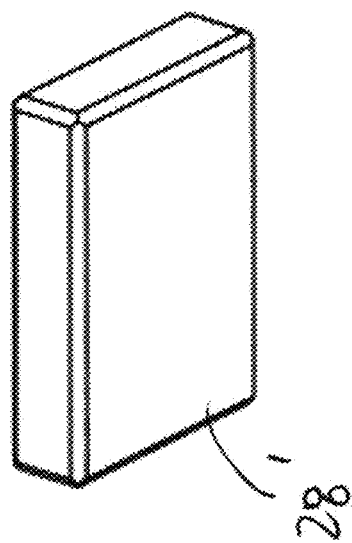
FIG. 12 is a perspective view of the permanent magnet employed in the laser scanning assembly shown in FIGS. 9A through 9E.
Figure 13D:
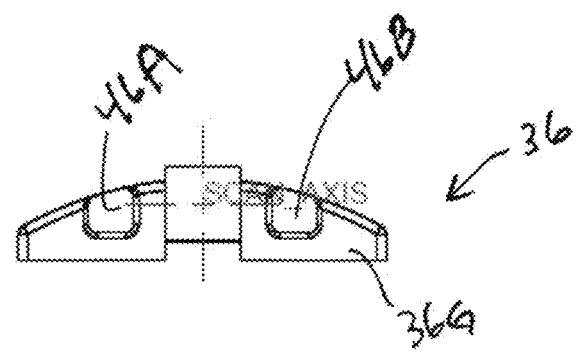
FIG. 13D is a top end view of the silicone frame in FIGS. 13A and 13B, showing its first set of motion limiting stops projecting therefrom.
Figure 13E:
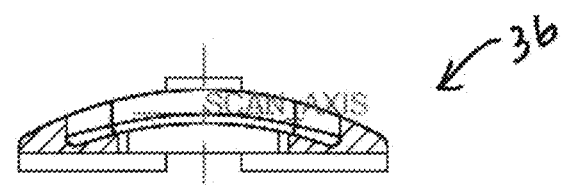
FIG. 13E is a cross-sectional view of the silicone frame in FIGS. 13A and 13B, taken along its horizontal extent, traverse to the scanning axis of the silicone frame.

As shown in FIGS. 2 and 10, the laser scanning module 30, 60 generally comprises a number of subcomponents, namely: laser scanning assembly 24 including a scan mirror and magnet rotor subassembly 25 torsionally supported by a stationary frame holder (i.e. stator structure) 26, wherein the silicone frame structure supports a reflective element (e.g. scan mirror) 27 and a permanent magnetic 28; an electromagnetic coil structure 29 including one or more wire coils wound on a coil support structure (e.g. bobbin) and driven by scanner coil drive and sense circuit 15, generating an electrical drive signal to drive the electromagnetic coil and force the laser scanning assembly 24 in oscillation about its scan axis; a laser beam source 17 for producing a visible laser beam 18; a beam deflecting mirror 31 for deflecting the laser beam 18 from its source 17, as incident beam 18A towards the mirror component of the laser scanning assembly 24, which sweeps the deflected laser beam 18 across the laser scanning field 5 and a bar code symbol 32 that might be simultaneously present therein during system operation. During scanner operation, the electromagnetic coil 29 generates magnetic forces on opposite poles of the permanent magnet 28, during scanning operation, and causes the scanning assembly 24 to oscillate about its scanning axis 32, in a manner which will be described in greater detail hereinafter.

In general, system 1 supports both an automatic-triggered mode of operation and a manually-triggered triggered mode of operation. During either mode of operation, a triggering event signal is generated (e.g. by object detector 6 or by manual trigger switch 4), and in response thereto, the laser scanning module 30, 60 generates and projects a laser scanning beam through the light transmission window 3, and across the laser scanning field external to the hand-supportable housing, for scanning an object in the scanning field 5. The laser scanning assembly 24 repeatedly scans the laser beam 18A across a code symbol 32 residing on an object in the laser scanning field 5. The light collection optics 19 collects light reflected/scattered from scanned code symbols on the object in the scanning field, and the photo-detector 20 automatically detects the intensity of collected light (i.e. photonic energy) and generates an analog scan data signal corresponding to the light intensity detected during scanning operations. The analog scan data signal processor/digitizer 21 processes the analog scan data signals, converts the processed analog scan data signals into digitized data signals, and then the digital data signals are converted into digital words. The programmed decode processor 22 decode processes the digital words, and generates symbol character data representative of each bar code symbol scanned by laser scanning beam. Symbol character data corresponding to the bar codes read by the decoder 22 is then transmitted to the host system via the I/O communication interface 23 which may support either a wired and/or wireless communication link, well known in the art. During object detection and laser scanning operations, the system controller 16 generates the necessary control signals for controlling operations within the laser scanning bar code symbol reading system.

Figure 3:
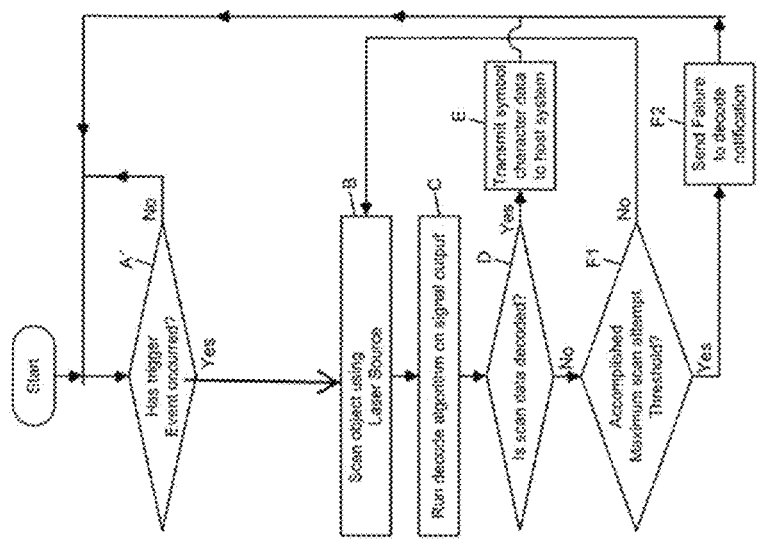
FIG. 3 sets forth a flow chart describing the major steps performed during the operation of the laser scanning bar code symbol reading system of FIG. 1.

Referring to FIG. 3, a method of reading bar code symbols and controlling operations within the laser scanning bar code reader 1 will be described in greater detail.

As indicated in FIG. 3, the process orchestrated by the system controller 16 begins at the START Block. Then at Block A in FIG. 3, the system controller determines if a trigger event has occurred (i.e. whether or not trigger signal has been manually generated by trigger 4, or automatically produced by IR detection subsystem 6). In the event that a trigger event has been detected at Block A, then at Block B the system controller 16 directs the laser scanning module 24 to scan the detected object with a laser beam generated by the VLD 17. If not, the system resides at Block A waiting for a trigger event signal.

At Block C, the decode processor 22 runs a decode algorithm on the captured scan data, and if at Block D, a bar code symbol is decoded, then at Block E, the produced symbol character data is transmitted to the host system, and the system controller returns to Block A. If, however, at Block D a bar code symbol is not decoded, then the system controller 16 determines at Block F whether or not the maximum scan attempt threshold has been reached, and if not, then the system controller 16 returns to Block B, and resumes the flow as indicated. However, if at Block F1, the system controller 16 determines that the maximum scan attempt threshold has been accomplished, then the system controller 16 proceeds to Block F2 and sends a Failure to Decode notification to the operator and returns to Block A.

Having described the method of operation above, it is appropriate at this juncture to describe the illustrative embodiments of the laser scanning modules that are employed in the code symbol reading system.

Figure 4A:
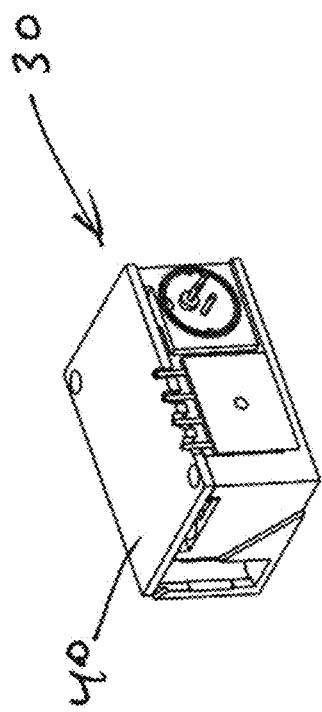
FIG. 4A is a first perspective view of a first illustrative embodiment of the laser scanning module according to present disclosure, employing a silicone-based torsional hinge scanning element having integrated motion limiters.
Figure 4C:
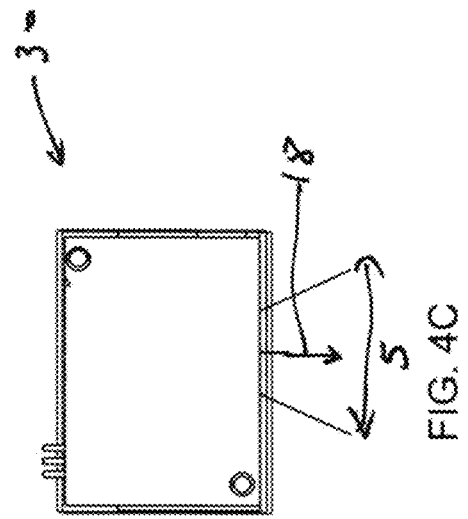
FIG. 4C is a plan view of the laser scanning module of the first illustrative embodiment.
Figure 4B:
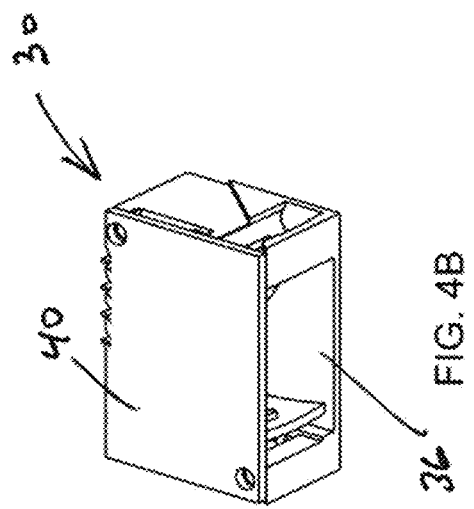
FIG. 4B is a second perspective view of the laser scanning module of the first illustrative embodiment.

Specification of the First Illustrative Embodiment of the Laser Scanning Module According to Present Disclosure, Employing a Silicone Torsional Hinge Scanning Element and an Omni-Directional Motion Limiting Subsystem As shown in FIGS. 4A through 4C, the laser scanning module 30 according to a first illustrative embodiment comprises: an engine housing or framework 35 having multiple sides, namely opposing sides, a front side with a light transmission aperture 36, and opposing rear side, a bottom side and opposing top side; a laser scanning assembly 24' having a scan mirror and magnet rotor subassembly 36 (i) having silicone scan mirror and magnet support frame 36 with torsional posts 36A and 36B, supported from a thermoplastic hinge holder (i.e. stationary stator structure) 37 mounted in the engine housing 35, and (ii) driven by electromagnetic force field generated by an electromagnetic coil structure 29 mounted in the engine housing 35; and at least one PC board 40, mounted on at least one side of the module housing, and having one or more electronic circuits formed thereon implementing the functions of the various subsystems described in the system block diagram shown in FIG. 3.

Figure 5A:
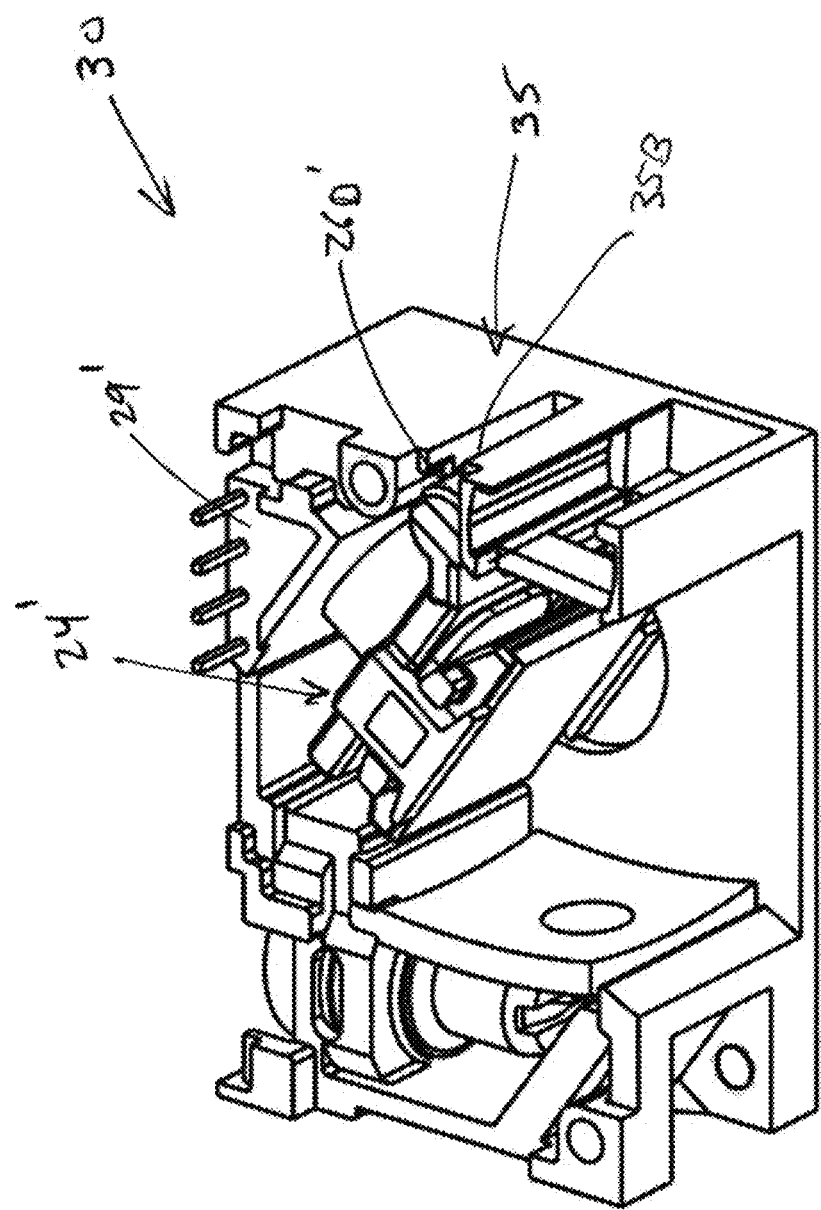
FIG. 5A is a perspective view of the laser scanning module of the first illustrative embodiment shown in FIG. 4A, with its top printed circuit (PC) board removed.
Figure 5B:
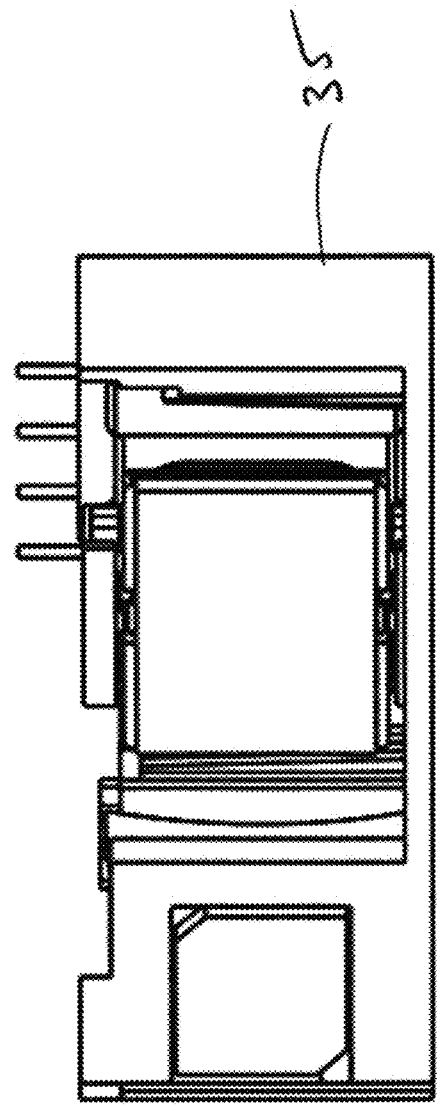
FIG. 5B is a side view of the laser scanning module of the first illustrative embodiment shown in FIG. 4A, with its top printed circuit (PC) board removed.
Figure 6A:
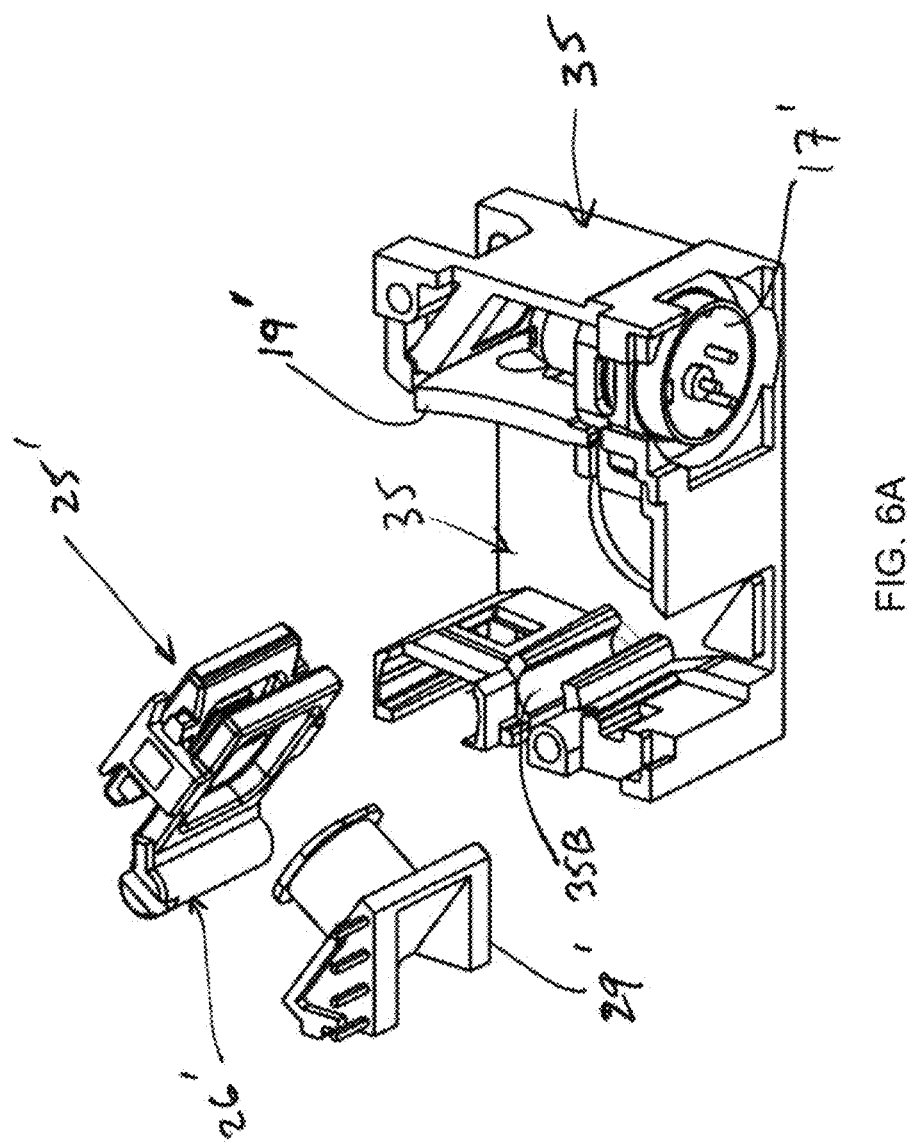
FIG. 6A is a first partially exploded view of the laser scanning module of the first illustrative embodiment shown in FIGS. 5A through 5C showing the laser scanning mechanism dismounted from the engine housing, and exploded into its electromagnetic coil structure and torsional-hinge based laser scanning assembly.

As shown in FIGS. 5A and 5C, the electromagnetic coil structure 29' is mounted within the module housing 35 on the rear side of the laser scanning assembly 24. The electromagnetic coil structure 29' has a plurality of electrically conductive pins connected to its coil windings, which are driven by scanner drive and sense circuits 15. The function of the electromagnetic coil 29' is to exert electromagnetic forces on a permanent magnet 28' retained in the scan mirror and magnet rotor subassembly 25', and cause the scan mirror and magnetic rotor subassembly 25' to oscillate about its scan axis 39 (from its home position shown in FIG. 9E), and sweep the laser scanning beam 18 across the laser scanning field 5.

In the illustrative embodiment shown in FIGS. 8A and 8C, the electromagnetic coil support structure 19 has the shape of a bobbin, formed by a pail of parallel flanges extending from a cylindrical portion 19. About the cylindrical portion, a primary drive coil 41A is wound and terminated in a first pair of electrically-conductive pins 42A and 42B. Also, a sense coil 41B is wound about the electromagnetic coil support structure 4 and terminated in a second pair of electrically-conductive pins 42. As shown in FIG. 8B, the electrically conductive pins 42 are arranged in a linear array configuration, but may be arranged in a different configuration, in different illustrative embodiments, as may be required or desired.

As shown in FIGS. 9A, 9B, 13A through 13E, a silicone scan mirror and magnet frame 36 comprises: having a first side 36A for mounting a scan mirror 27'; a second side 36B for mounting a permanent magnet 28'; and a pair of silicone torsional hinges 36C and 36D aligned along a scan axis 39 passing through the silicone frame 36. As shown in FIGS. 9C and 10, the scan mirror 27' is mounted on the first side of the silicone frame 36A by a first layer of adhesive 43. The permanent magnet 28' is mounted on said second side of the silicone frame 36B using a second layer of adhesive 44. In the illustrative embodiment, the cross-sectional dimensions of the torsional posts 36E and 36F are circular, but can be rectangular or other regular or irregular geometrical shapes, as may be required or desired, for an particular application. Also, in the illustrative embodiment, the first side 36A and the second side 36B of the silicone frame 36 reside on the same side of the scan axis 39 passing through the silicone frame 36. Also, the silicone frame 36 has a first central opening 36I on the front side 36H, and a wider second opening 36J on the second side 36B, for mounting magnet 28' to mirror 27'.

Figure 9A:
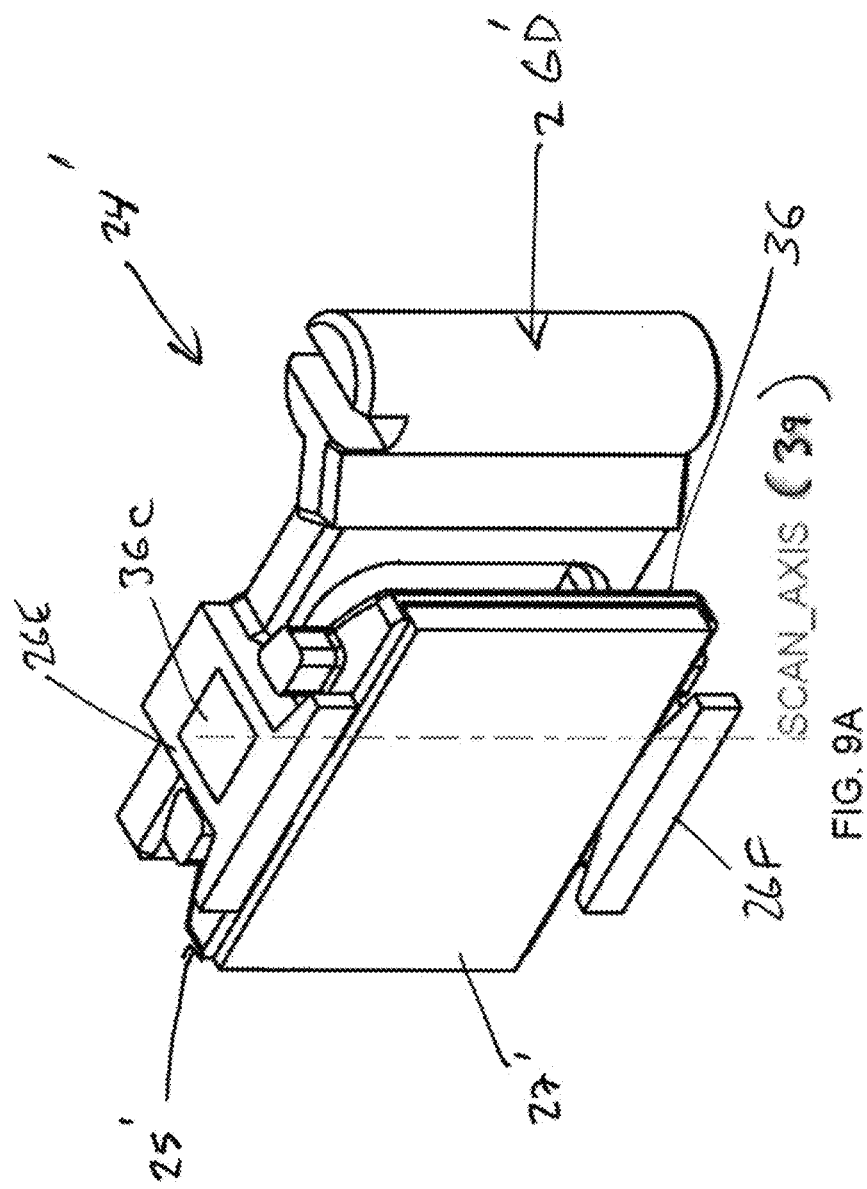
FIG. 9A is a front perspective view of the laser scanning assembly of the first illustrative embodiment, shown fully assembled, but removed from its support recess within the module housing shown in FIGS. 6A and 6B.
Figure 9E:
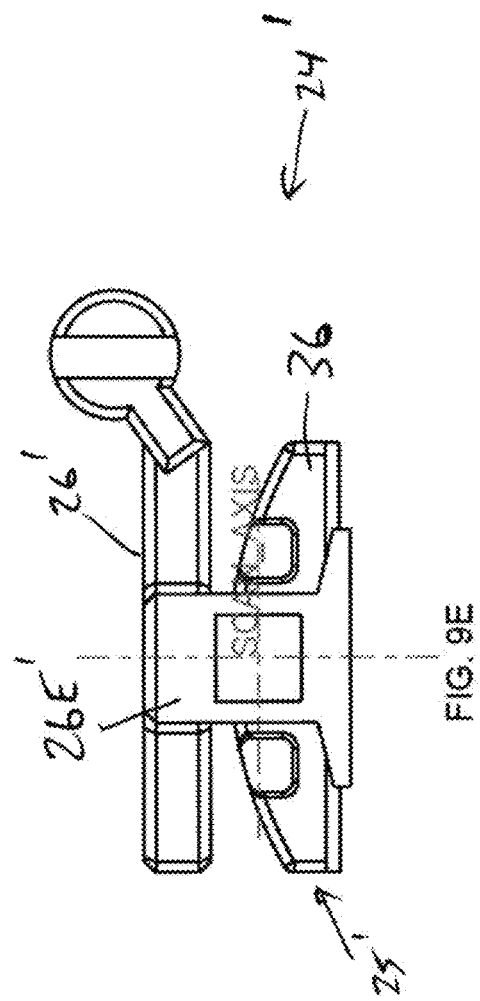
FIG. 9E is a plan view of the laser scanning assembly of the first illustrative embodiment, shown fully assembled, but removed from its support within the module housing shown in FIGS. 6A and 6B.

As will be described in greater detail hereinafter, the pair of silicone torsional hinges 36A and 36D undergo elastically-deformation when the electromagnet coil drives the rotor away from its home position, as shown in FIG. 9E, to its maximum clockwise and counter-clockwise rotations about the scan axis, and therewhile generates elastic returning force to the scan mirror and magnet rotor subassembly 25, having a magnitude which is linearly proportional to the magnitude of the angle of rotation of said scan mirror and magnet rotor subassembly 25 about said scan axis 39.

As shown in FIGS. 13A and 13B, the silicone frame 36 comprises: an upper end or edge 36G having a first pair of stops 46A and 46B formed on opposite sides of the torsional post 36C; and a lower end or edge 36H having a second pair of stops 46C and 46D formed on opposite sides of the torsional post 36D. As illustrated in FIGS. 16A through 20C, the spacing of these stops 46A, 46B, 46C, and 46D is selected so that these silicone post-like stops effectively limit the angular and translational displacement of the scan mirror and magnet rotor subassembly 25' when the laser scanning assembly is subjected to external shock forces.

Figure 14B:
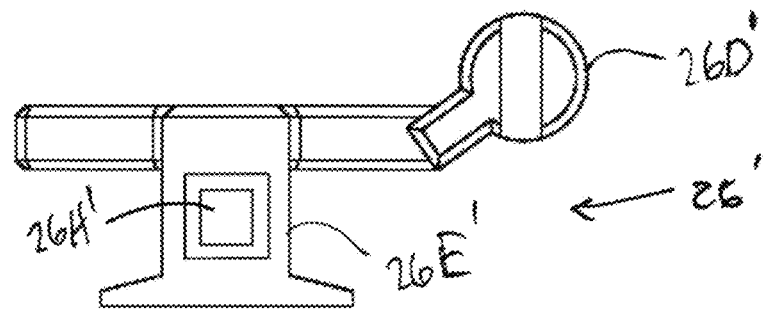
FIG. 14B is a plan view of the frame holder shown in FIG. 14A, typically made from a thermoplastic.
Figure 14C:
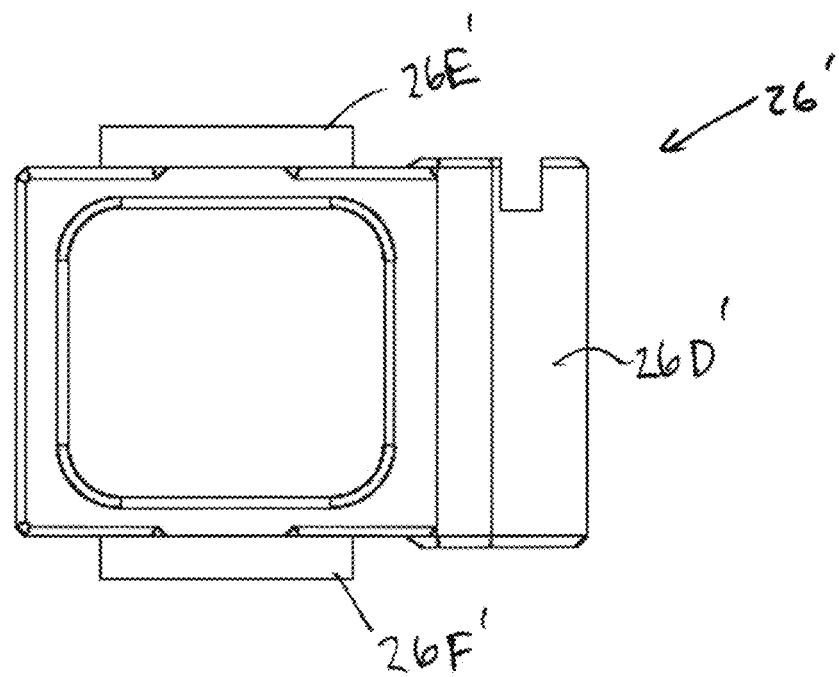
FIG. 14C is an elevated side view front view of the frame holder shown in FIGS. 14A and 14B.

As shown in FIGS. 14A through 14C, the stator structure 26' comprises: a frame holder 26A' having a front side 26B' and a rear side 26C'; a support member 26D' for supporting the silicone frame 36 within a cylindrical recess 35B in the module housing 35 shown in FIG. 5A; and a pair of top and bottom support elements 26E' and 26F' provided on the front side of the frame holder, in a spaced apart and aligned manner. As arranged, the pair of silicone torsional hinges 36E and 36F are mounted to or through apertures 26G' and 26H' in the support elements 26E' and 26F', respectively, and torsionally support the scan mirror and magnet rotor subassembly between the support elements and allow the scan mirror and magnet rotor assembly 25' to oscillate freely about the scan axis 39 passing through the silicone torsional hinges 36E and 36F and the support elements 26E' and 26F'.

As shown in FIGS. 14A through 14C, the upper frame support element (i.e. projection) 26' further comprises a first pair of projections 26I' and 26J' that extend transversely from the distal end of the upper frame support element 26E', for engaging with the first pair of upper silicone stop posts 46A and 46B, as illustrated in FIGS. 16A through 20C, and stopping clockwise and counter-clockwise rotation, when the laser scanning module is subjected to external shock forces exceeding a predetermined threshold (e.g. 200 G). Also, the lower frame support element (i.e. projection) 26F' further comprises a second pair of projections 26K' and 26L' that extend transversely from the distal end of the lower frame support element 26F', for engaging with the second pair of upper silicone stop posts 46C and 46D, as illustrated in FIGS. 16A through 20C, and stopping clockwise and counter-clockwise rotation, when the laser scanning module is subjected to external shock forces exceeding a predetermined threshold (e.g. 200 G).

Figure 18A:
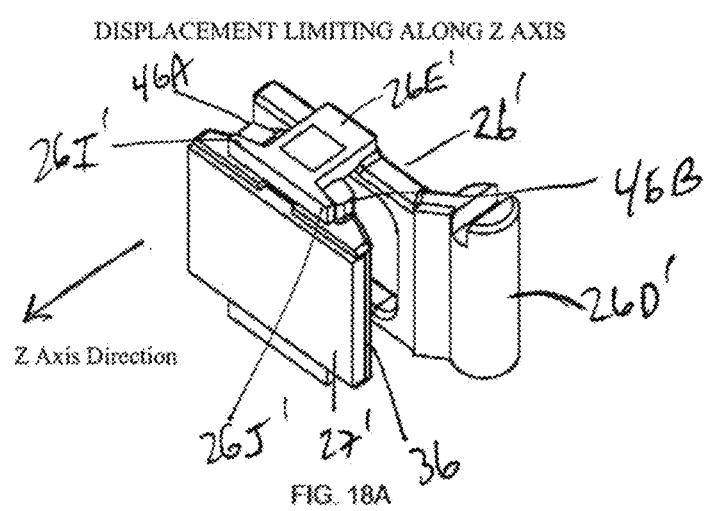
FIG. 18A is a perspective view of the laser scanning assembly of FIGS. 9A through 9E, illustrating that the pair of silicone stops on the upper edge of the silicone frame striking corresponding transversely extending stop projections on the thermoplastic frame holder, limiting motion of the scan mirror and magnet rotor subassembly along the z axis/direction when the laser scanning assembly is subjected to external shock forces exceeding a predetermined threshold (e.g. 200 G along z axis)
Figure 18B:
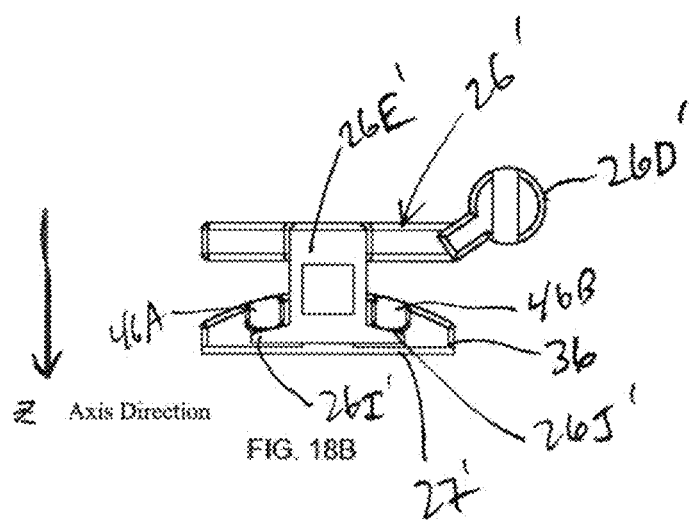
FIG. 18B is a plan view of the laser scanning assembly shown in FIG. 18A.
Figure 18C:
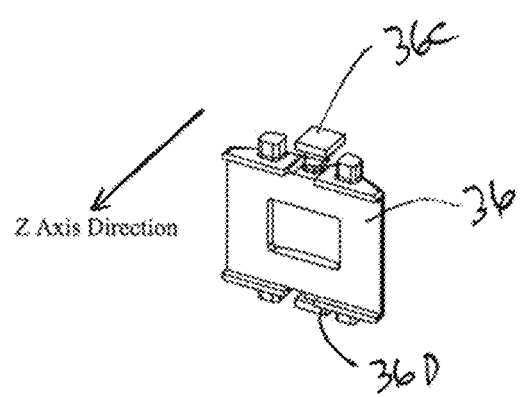
FIG. 18C is a perspective view of the silicone frame in the laser scanning assembly shown in FIGS. 18A and 18B, illustrating that the deformation of the silicone torsional hinges/posts along the z axis/direction, limited by the pair of silicone stops on the silicone frame striking corresponding transversely extending stop projections on the thermoplastic frame holder, in response to the laser scanning assembly being subjected to external shock forces exceeding a predetermined threshold along the z axis direction.

As shown in FIGS. 13B and 14A, the silicone frame 36 has a rear portion 36B, whereas the thermoplastic frame holder 26 has a front surface 26B'. As illustrated in FIG. 18B, when the laser scanning assembly is subject to external shock forces exceeding a particular threshold along the −Z axis direction, then the rear portion 36D of the silicon frame 36 engages the front surface 26B' of the frame holder 26', thereby limiting the linear displacement of the scan mirror and magnet rotor subassembly 25' along the −Z axis direction. As illustrated in FIGS. 18A through 18C, then when the laser scanning assembly is subject to external shock forces exceeding a particular threshold along the +Z axis direction, then the silicone stop posts 46A and 46B, and 46C and 46D strike the corresponding stop projections 26I' and 26J', and 26K' and 26L', respectively, thereby limiting the linear displacement of the scan mirror and magnet rotor subassembly 25' along the +Z axis direction.

Specification of the Omni-Directional Motion Limiting Structures Integrated within the Laser Scanning Assembly of First Illustrative Embodiment As will be illustrated in greater detail hereinafter, when the laser scanning module is subjected to external shock forces, and the laser scanning assembly 24' undergoes extreme limits of rotational motion about the virtual axis of rotation 39, the function of the omni-directional motion stop projection is to strike corresponding stops surfaces on the stationary stator structure 26', thereby limiting the angular and translational motion of the scanning subassembly 24', while preventing damage to the laser scanning assembly.

FIG. 15 illustrates the normal range of scan angle motion about the scan axis 39 in the clockwise the counter-clockwise directions, while the elastically-distorted torsional hinges (i.e. posts) 26E' and 26F' generate linear restoring/return forces on the scan mirror and magnet rotor subassembly 25', to return the same to the home position shown in FIG. 9E, during scanning operations.

FIGS. 10A1 and 10A2 illustrate the rotational motion of the scan mirror and magnet rotor subassembly 25', about its virtual axis of rotation, in response to magnetic forces generated by the electromagnetic coil structure 25', and exerted against the permanent magnet embedded therewithin.

Figure 16A:
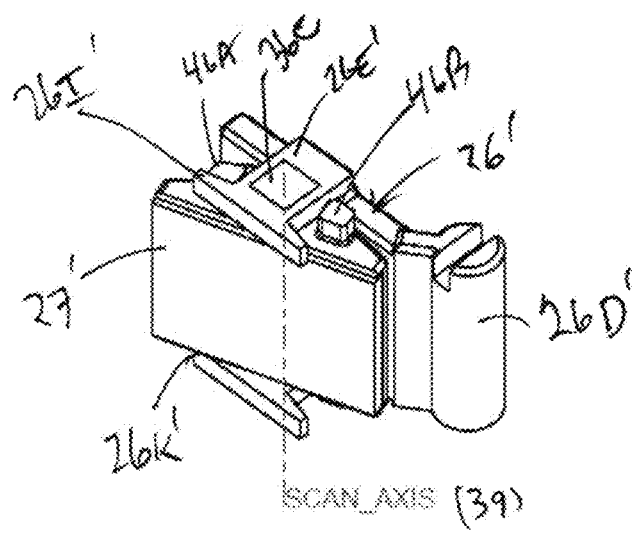
FIG. 16A is a perspective view of the silicone frame shown in FIGS. 13A through 13E, illustrating the scan angle motion of the scan mirror and magnet rotor subassembly about the scan axis being limited (i.e. stopped) in the counter-clockwise direction, by a two pairs of motion limiters (i.e. silicone stops) projecting from the top and bottom edges of the silicone frame, and striking stop elements extending transversely from the support projections supporting the silicone frame, as the permanent magnet supported on the rear side of the silicone frame is driven by electromagnetic forces produced by the electromagnetic coil structure in the laser scanning module.
Figure 16B:
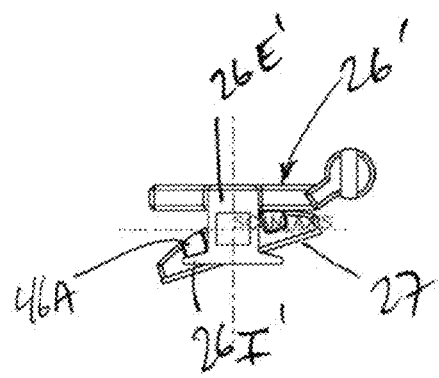
FIG. 16B is a plan view of the laser scanning module shown configured in FIG. 15A.

FIG. 16A illustrates the scan angle motion of the scan mirror and magnet rotor subassembly about the scan axis 39 being limited (i.e. stopped) in the counter-clockwise direction, by a pair of motion limiters (i.e. silicone stops) 46A, 46C projecting from the top and bottom edges of the silicone frame 36, and striking stop elements extending transversely from the support projections supporting the silicone frame, as the permanent magnet supported on the rear side of the silicone frame is driven by electromagnetic forces produced by the electromagnetic coil structure in the laser scanning module.

Figure 17:
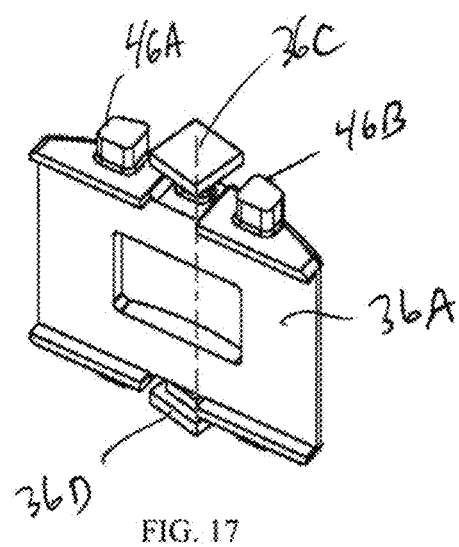
FIG. 17 is a perspective view of the silicone frame shown in FIG. 16, illustrating the torsional twist that the torsional hinges undergone during 12.5 degrees of rotation from the home position, in either the clockwise or counter-clockwise direction, thereby generating an elastic returning force to the silicone frame, the magnitude of which is linearly proportional to the magnitude of the angle of rotation of the silicone frame about its scan axis of rotation.

FIG. 17 illustrates the torsional twist that the torsional hinges 36C and 36D undergone during 12.5 degrees of rotation from the home position, in either the clockwise or counter-clockwise direction, thereby generating an elastic returning force to the silicone frame 36, the magnitude of which is linearly proportional to the magnitude of the angle of rotation of the silicone frame about its scan axis of rotation.

FIGS. 18A and 18B illustrate that the pair of silicone stops 46A and 46B on the upper edge of the silicone frame 36 striking corresponding transversely extending stop projections 26I', 26J' on the thermoplastic frame holder 26', and limiting the motion of the scan mirror and magnet rotor subassembly 25' along the z axis direction when the laser scanning assembly is subjected to external shock forces exceeding a predetermined threshold (e.g. 200 G along z axis). FIG. 18C illustrates the deformation that the silicone torsional hinges (i.e. posts) 36E and 36F has undergone in the z axis/direction, in the laser scanning assembly of FIGS. 18A and 18B.

Figure 19A:
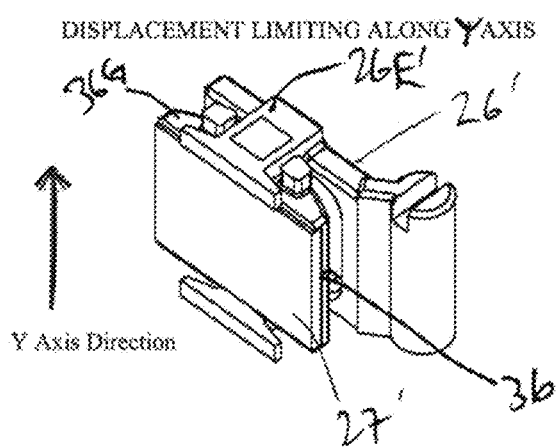
FIG. 19A is a perspective view of the laser scanning assembly of FIGS. 9A through 9E, illustrating that the upper edge of the silicone frame striking the upper frame support projection of the thermoplastic frame holder, thus limiting motion of the scan mirror and magnet rotor subassembly along the y axis direction when the laser scanning assembly is subjected to external shock forces (e.g. 200 G) along the axis direction.
Figure 19B:
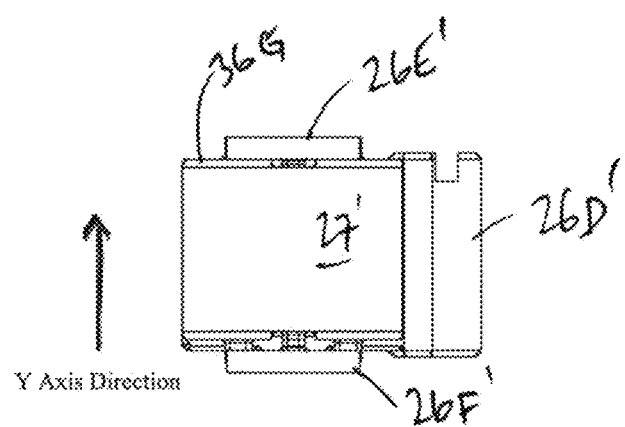
FIG. 19B is an elevated front view of the laser scanning assembly of FIG. 19A.
Figure 19C:
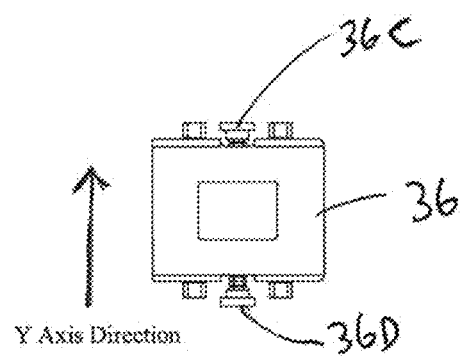
FIG. 19C is a perspective view of the silicone frame in the laser scanning assembly shown in FIGS. 19A and 19B, illustrating that the deformation of the silicone torsional hinges/posts along the y axis direction, limited by the upper edge of the silicone frame striking the upper frame support projection on the thermoplastic frame holder, in response to the laser scanning assembly being subjected to external shock forces exceeding a predetermined threshold along the y axis direction.

FIGS. 19A and 19B illustrate that the upper end (i.e. edge) 36G of the silicone frame 36 striking the upper frame support projection 26E' of the thermoplastic frame holder, thus limiting motion of the scan mirror and magnet rotor subassembly 25' along the y axis direction when the laser scanning assembly is subjected to external shock forces (e.g. 200 G) along the axis direction. FIG. 19C illustrates that the deformation of the silicone torsional hinges/posts 36E and 36F along the y axis direction, limited by the upper edge of the silicone frame 36 striking the upper frame support projection 26E on the thermoplastic frame holder, in response to the laser scanning assembly 24' being subjected to external shock forces exceeding a predetermined threshold along the y axis direction, as shown in FIGS. 20A and 20B.

Figure 20A:
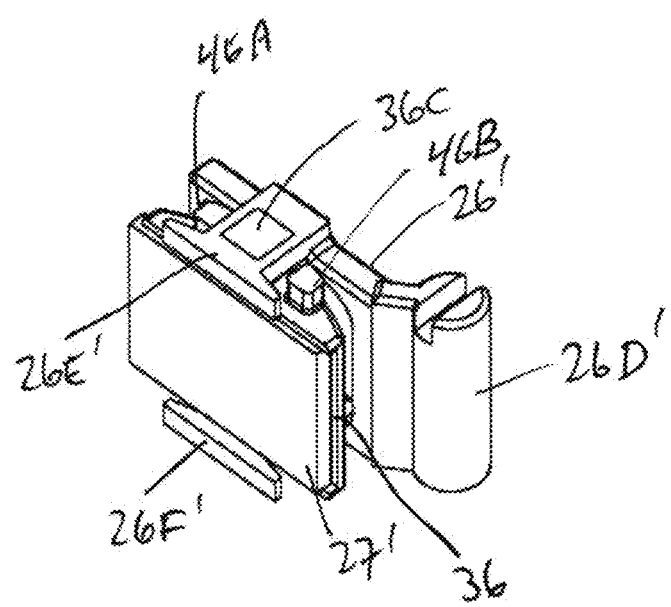
FIG. 20A is a perspective view of the laser scanning assembly of FIGS. 9A through 9E, illustrating the silicone left-side stops on the top and bottom edges of the silicone frame striking corresponding stop surfaces of the support from projections on the thermoplastic frame holder, thus limiting motion of the scan mirror and magnet rotor subassembly along the x axis direction when the laser scanning assembly is subjected to external shock forces above a predetermined threshold (e.g. 200 G) along x axis direction.
Figure 20B:
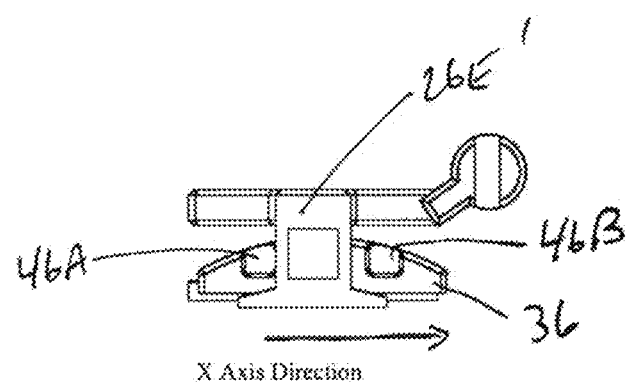
FIG. 20B is a plan view of the laser scanning assembly of FIG. 20A, illustrating that the stop on the upper edge of the silicone frame striking corresponding stop surfaces on the frame support projection on the thermoplastic frame holder, and thus limit motion of the scan mirror and magnet rotor subassembly along the x axis direction when the laser scanning assembly is subjected to external shock forces above a predetermined threshold (e.g. 200 G) along x axis direction.
Figure 20C:
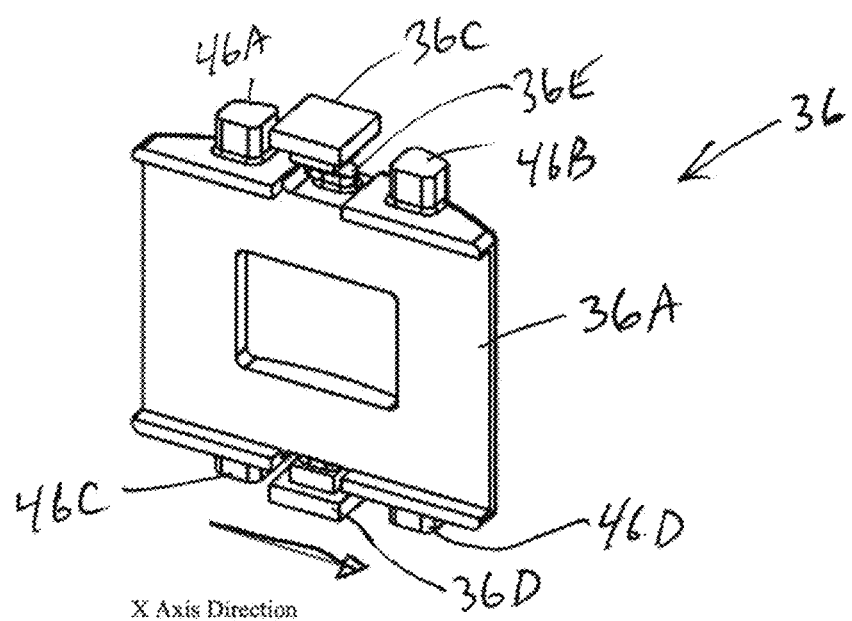
FIG. 20C is a perspective view of the silicone frame in the laser scanning assembly shown in FIGS. 20A and 20B, illustrating that the deformation of the silicone torsional hinges/posts along the x axis direction, limited by the stops on the top and bottom edges of the silicone frame striking corresponding stop surfaces on the top and bottom frame support projections on the thermoplastic frame holder, in response to the laser scanning assembly being subjected to external shock forces exceeding a predetermined threshold (e.g. 200 G) along the x axis direction.
Figure 21:
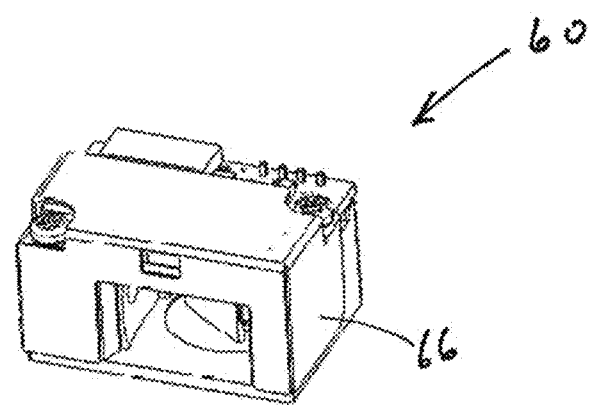
FIG. 21 is a perspective view of the second illustrative embodiment of the laser scanning module according to present disclosure, employing a silicone-based torsional-hinge scanning assembly employing omni-directional integrated motion limiters.

FIGS. 20A and 20B illustrates the silicone left-side stops 46A and 46C on the top and bottom edges of the silicone frame striking corresponding stop surfaces on the frame support projections 26E', 26F' on the thermoplastic frame holder 26', thus limiting motion of the scan mirror and magnet rotor subassembly 25' along the x axis direction when the laser scanning assembly is subjected to external shock forces above a predetermined threshold (e.g. 200 G) along x axis direction. FIG. 20C illustrates that the deformation of the silicone torsional hinges/posts 36C and 36D along the x axis direction, limited by the stops 46Am 46B on the top and bottom edges of the silicone frame 36 striking corresponding stop surfaces on the top and bottom frame support projections 26E', 26F' on the thermoplastic frame holder, as shown in FIGS. 20A and 20B.

All components of the laser scanning assembly, except for the magnet 28', silicone frame 36, and electromagnetic coil windings 41A, 41B can be a molded as thermoplastic parts using suitable thermoplastic material (e.g. polycarbonate, acrylonitrile butadiene styrene, and/or synthetic polymers known generically as polyamides, etc). The permanent magnet 28' can be realized using Neodymium Iron Boron Type N50 magnetic material, or similar material. The elastomeric frame element 36, with integrated torsional posts 36C and 36D, can be injection molded from a Liquid Silicone Rubber (LSR) material, such as Momentive Performance #2030 Silicone or Shin-Etsu KE2090-30AB Select Hesive with enhanced adhesive properties. The layer of adhesive 43, 44 can be a Dow Corning 734 adhesive, or similar material, and the primer layer could be a GE SS4004P or similar material.
Specification of the Second Illustrative Embodiment of the Laser Scanning Module According to Present Disclosure, Employing a Silicone Torsional Hinge Scanning Element As shown in FIGS. 21 through 24, the laser scanning module 60 according to a second illustrative embodiment comprises: an engine housing or framework 65 having multiple sides, namely opposing sides, a front side with a light transmission aperture 66, and opposing rear side, a bottom side and opposing top side; electromagnetic coil structure 29"; a laser scanning assembly 24" having a scan mirror and magnet rotor subassembly 25" with a silicone based frame 68 torsionally-supported from a frame holder (i.e. stationary stator structure) 26" supported in the engine housing 65, and driven by an electromagnetic force field generated by an electromagnetic coil structure 29" mounted in the engine housing 65; and at least one PC board 68, mounted on at least one side of the module housing, and having one or more electronic circuits formed thereon implementing the functions of the various subsystems described in the system block diagram shown in FIG. 3.

Figure 22:
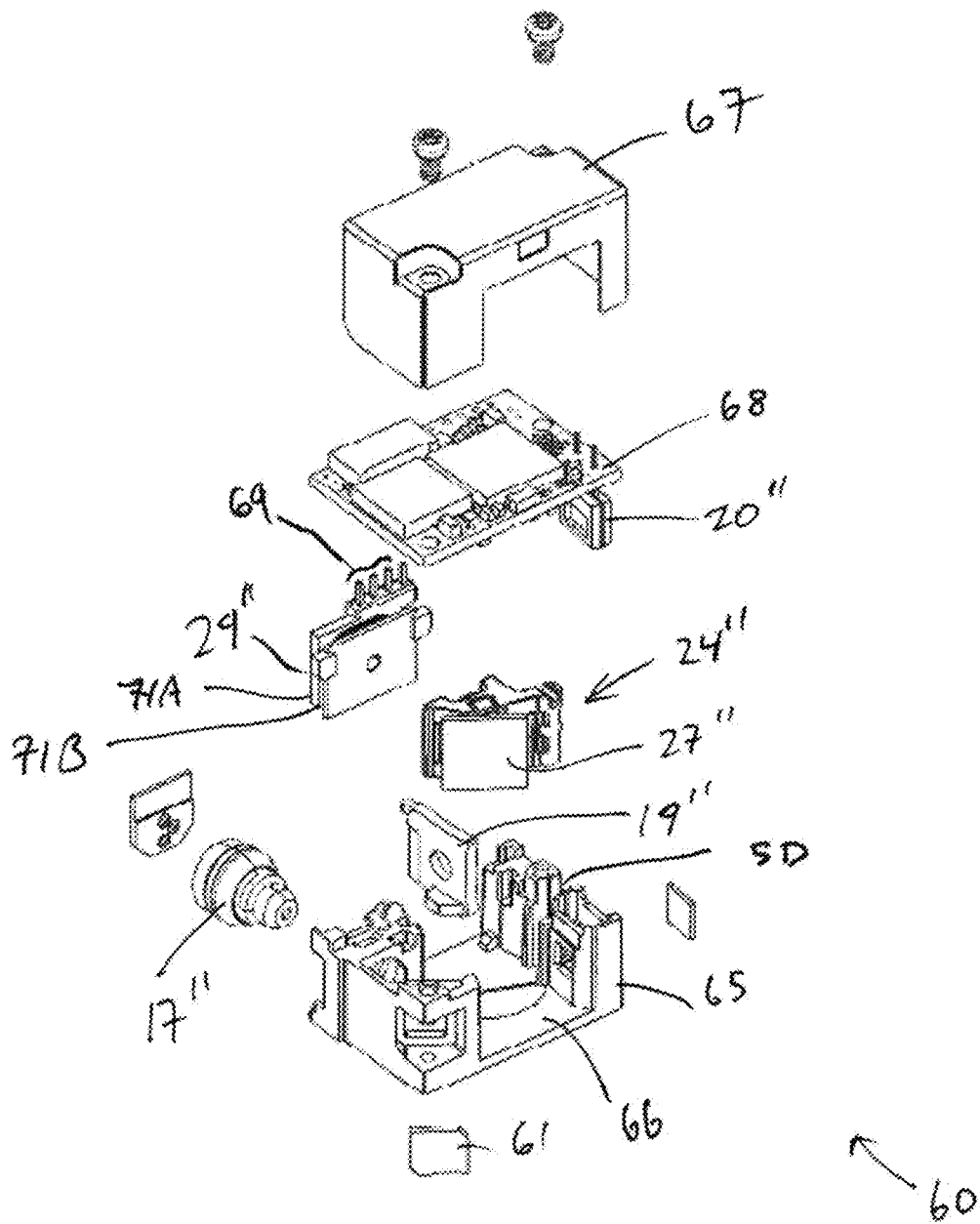
FIG. 22 is an exploded view of the second illustrative embodiment of the laser scanning module shown in FIG. 21, comprising components including a laser scanning assembly with a silicone torsional-hinge scanning element (i.e. scan mirror and magnet rotor) driven by an electromagnetic coil structure, supplied with electrical current by drive circuits on a PC board mounted on the top side of the module housing.
Figure 23:
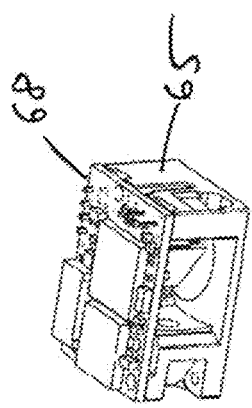
FIG. 23 is a perspective view of the laser scanning module shown in FIGS. 21 and 22, with its housing cover removed for purposes of illustration.

As shown in FIGS. 22 and 24, the electromagnetic coil structure 29" is mounted within the module housing 65 on the rear side of the laser scanning assembly 24". The electromagnetic coil structure 29" has a plurality of electrically conductive pins 69 connected to its coil windings, which are driven by scanner drive and sense circuits 15. The function of the electromagnetic coil 29" is to exert electromagnetic forces on a permanent magnet 28" retained in the scan mirror and magnet rotor subassembly 25", and cause the scan mirror and magnetic rotor subassembly 70 to oscillate about its virtual axis of rotation 70, and sweep the laser scanning beam 18 across the laser scanning field 5.

In the illustrative embodiment shown in FIGS. 22 and 24, the electromagnetic coil support structure 29" has the shape of a bobbin, formed by a pair of parallel flanges and extending from a cylindrical portion, about which a primary drive coil 71A is wound and terminated in a first pair of electrically-conductive pins. Also, a sense coil 71B is wound about the electromagnetic coil support structure 29", and terminated in a second pair of electrically-conductive pins. As shown in FIG. 24, the electrically conductive pins 69 are arranged in a linear array configuration, but may be arranged in a different configuration, in different illustrative embodiments, as may be required or desired.

Figure 25C:
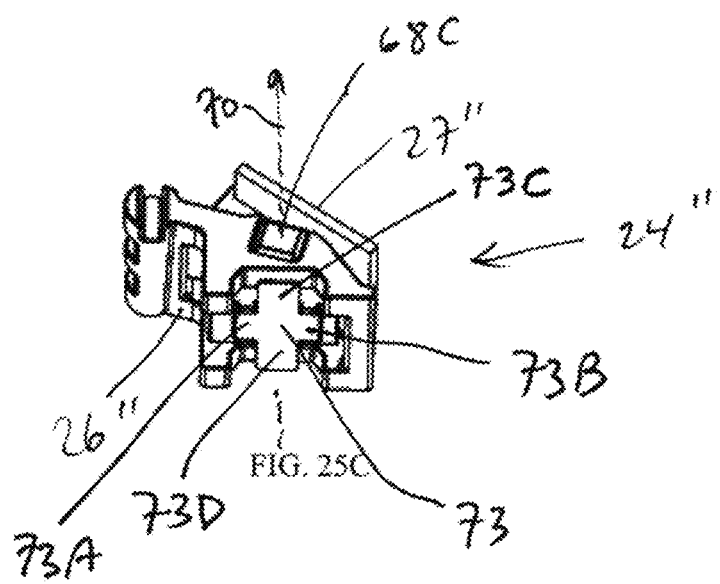
FIG. 25C is a second perspective view of the laser scanning assembly shown in FIG. 25A.
Figure 25E:
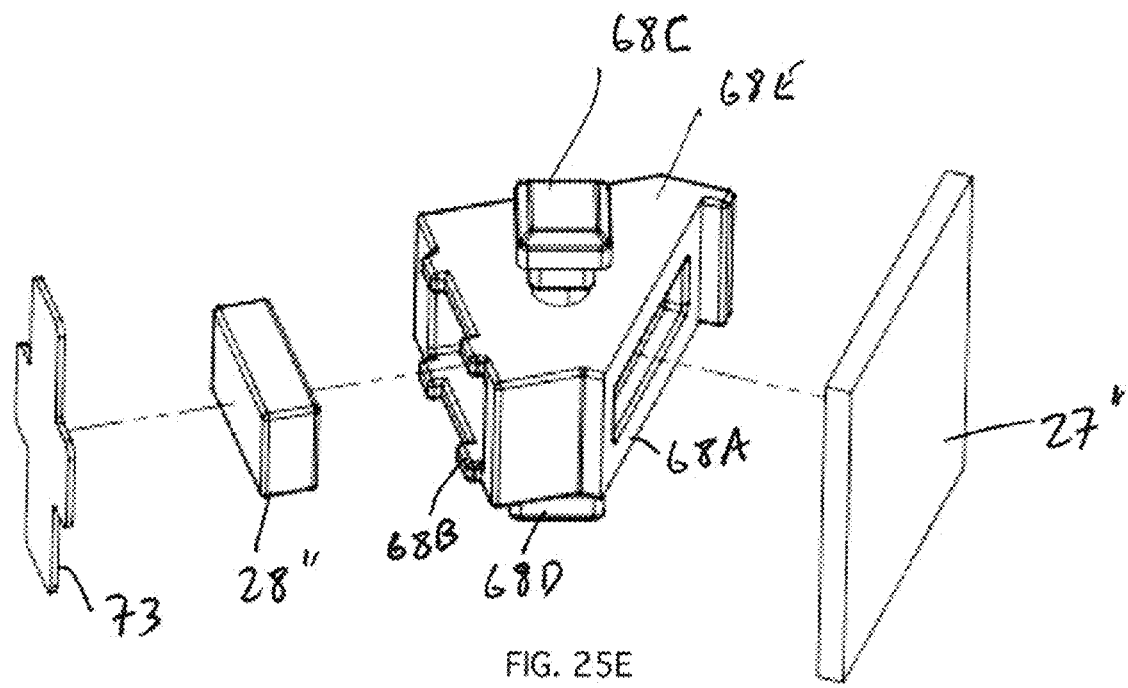
FIG. 25E is a perspective exploded view of the scan mirror and magnet rotor subassembly employed in the laser scanning assembly shown in FIGS. 25A through 25D.
Figure 25F:
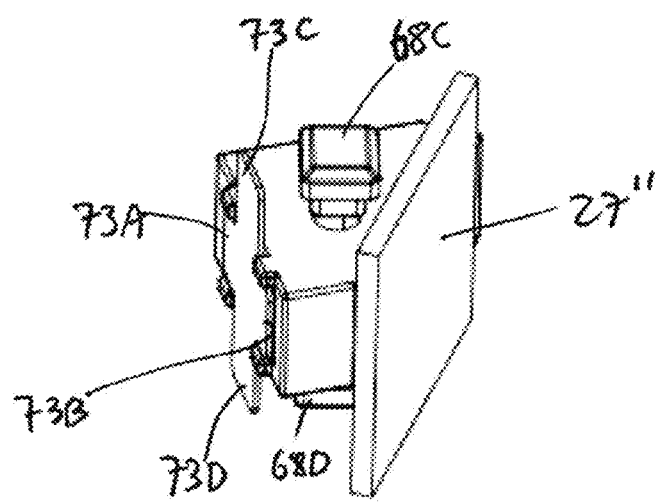
FIG. 25F is a second perspective exploded view of the scan mirror and magnet rotor subassembly employed in the laser scanning assembly shown in FIGS. 25A through 25D.

As shown in FIGS. 25A through 25D, the laser scanning assembly of the second illustrative embodiment 24" comprising: (i) a frame holder 26"; (ii) a silicone frame 68 having a scan mirror mounting surface 68A, a magnet mounting surface 68B and a pair of torsional silicone hinges (i.e. posts) 68E and 68F connected to the frame holder 26" by way of the silicone torsional hinges (i.e. hinge posts) 68C and 68D aligned along an axis of rotation (i.e. scanning axis) and either snap-fitted through apertures 26E" and 26F", or over-molded to the frame holder; (iii) scan mirror 27" mounted to the scan mirror mounting surface 68A; (iv) a magnet 28" mounted to the magnet mounting surface 68B; and (v) an omni-directional motion limiting structure 73 mounted over the magnet 28" on the rear side of the silicone frame. Notably, as best shown in FIGS. 25C and 25F, the omni-directional motion limiting structure 73 is realized as a thin cross-shaped structure, with wide projections 73A, 73B, 73C and 73D extending in each of its four orthogonal directions, namely +X, –X, +Y, –Y, respectively.

Figure 26A:
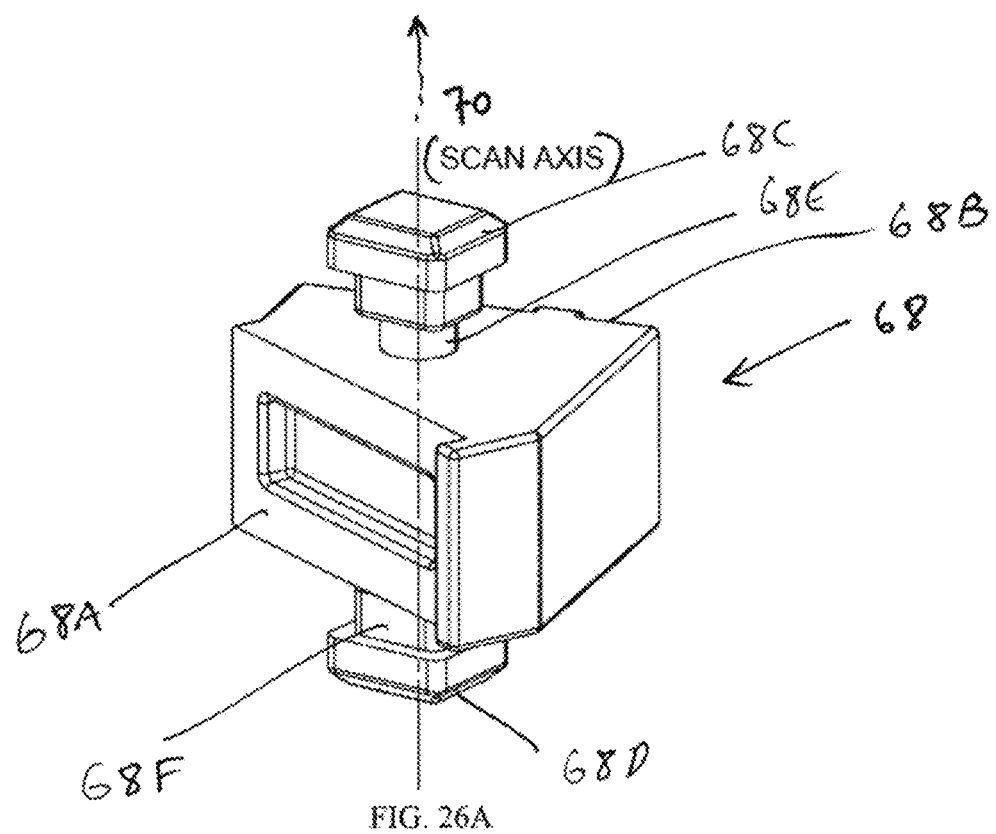
FIG. 26A is a perspective view of the silicone torsional-type scan mirror and magnet frame (i.e. rotor) employed in the laser scanning assembly shown in FIGS. 25A and 25C, showing its torsional hinge posts aligned along the scan axis thereof.
Figure 26D:
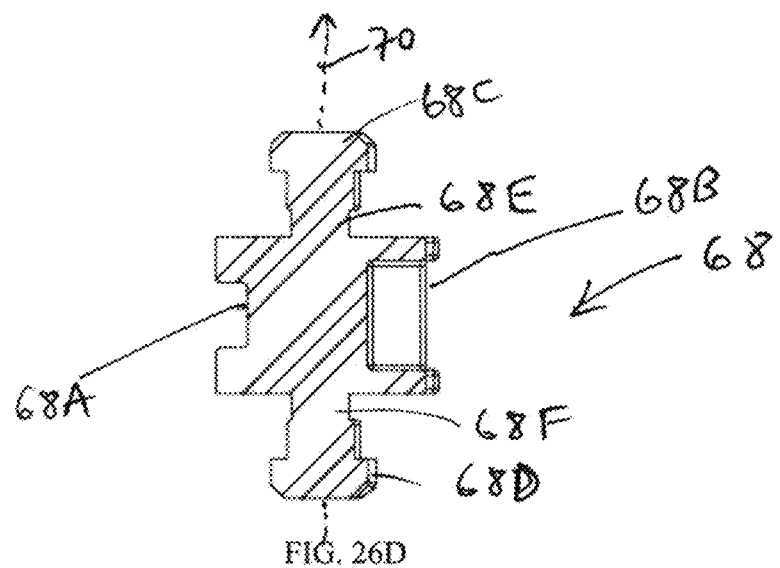
FIG. 26D is a cross-sectional view of the silicone frame (i.e. rotor) taken along line 26D-26D in FIG. 26C.

FIGS. 26A through 26D illustrate the silicone torsional-type scan mirror and magnet frame (i.e. rotor) 25" employed in the laser scanning assembly 24", shown in FIGS. 25A and 25C. As shown, the torsional hinge posts 68C and 68D are aligned along the scan axis 70 thereof. The distal portions of each silicone torsional hinge 68C and 68D are enlarged greater than the diameter of the intermediate portion 68E and 68F of the hinge posts 68C and 68D. As shown in FIG. 26B, the mirror support/mounting surface (i.e. recess) 68A is on the opposite side of magnet support/mounting surface 68B, with the torsional posts 68C and 68D disposed therebetween. This results in a symmetrical arrangement of the scan mirror and permanent magnet about the scan axis 70.

Figure 27A:
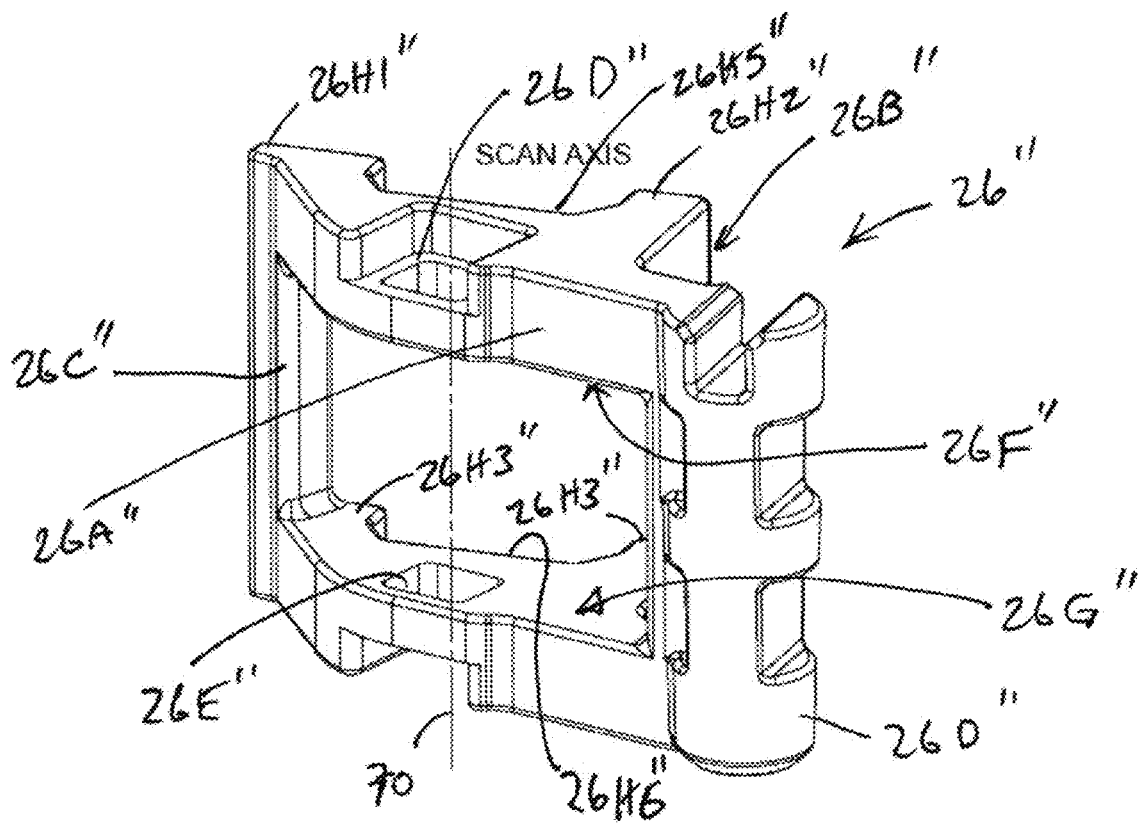
FIG. 27A is a perspective view of the thermoplastic frame holder employed in the laser scanning assembly shown in FIGS. 25A and 25C, removed from the laser scanning assembly.
Figure 27D:
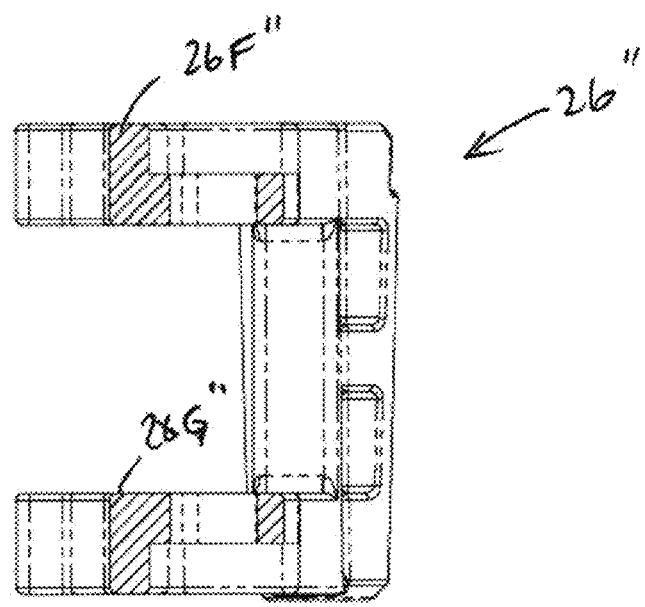
FIG. 27D is a cross-sectional view of the thermoplastic frame holder (i.e. stator) taken along line 26D-26D in FIG. 27C.

FIGS. 27A through 27D illustrate the thermoplastic frame holder 26" employed in the laser scanning assembly 24" shown in FIGS. 25A and 25C, removed from the laser scanning assembly. As shown in FIG. 27A, the frame holder 26" has a frame-like geometry, with a central opening 26C" with top and bottom edge surfaces 26E" and 26F", and a pair of apertures 26F" and 26G" formed in the top and bottom portions of the frame holder 26". The distal portions of the hinge posts 68C and 68D are mounted through apertures 26D" and 26E", in a tight-fit, or other manner. As shown in FIGS. 27A, 27B and 27C, a cylindrical support post 26D" extends from the frame holder on its right side for mounting in a cylindrical recess 65B formed in the laser module housing 65, as shown in FIG. 22. This support post maintains the frame holder stationary at a close distance from the electromagnetic coil structure 29" so that the coil can exert magnetic forces on the permanent magnet, using preferably the small level of coil drive current, for a given level of voltage across the coil. As shown in FIGS. 27A and 27B, the rear side of the frame holder 26" has integrated motion stop projections 26 disposed on the top and bottom portions thereof.

Figures 28A, 28B:
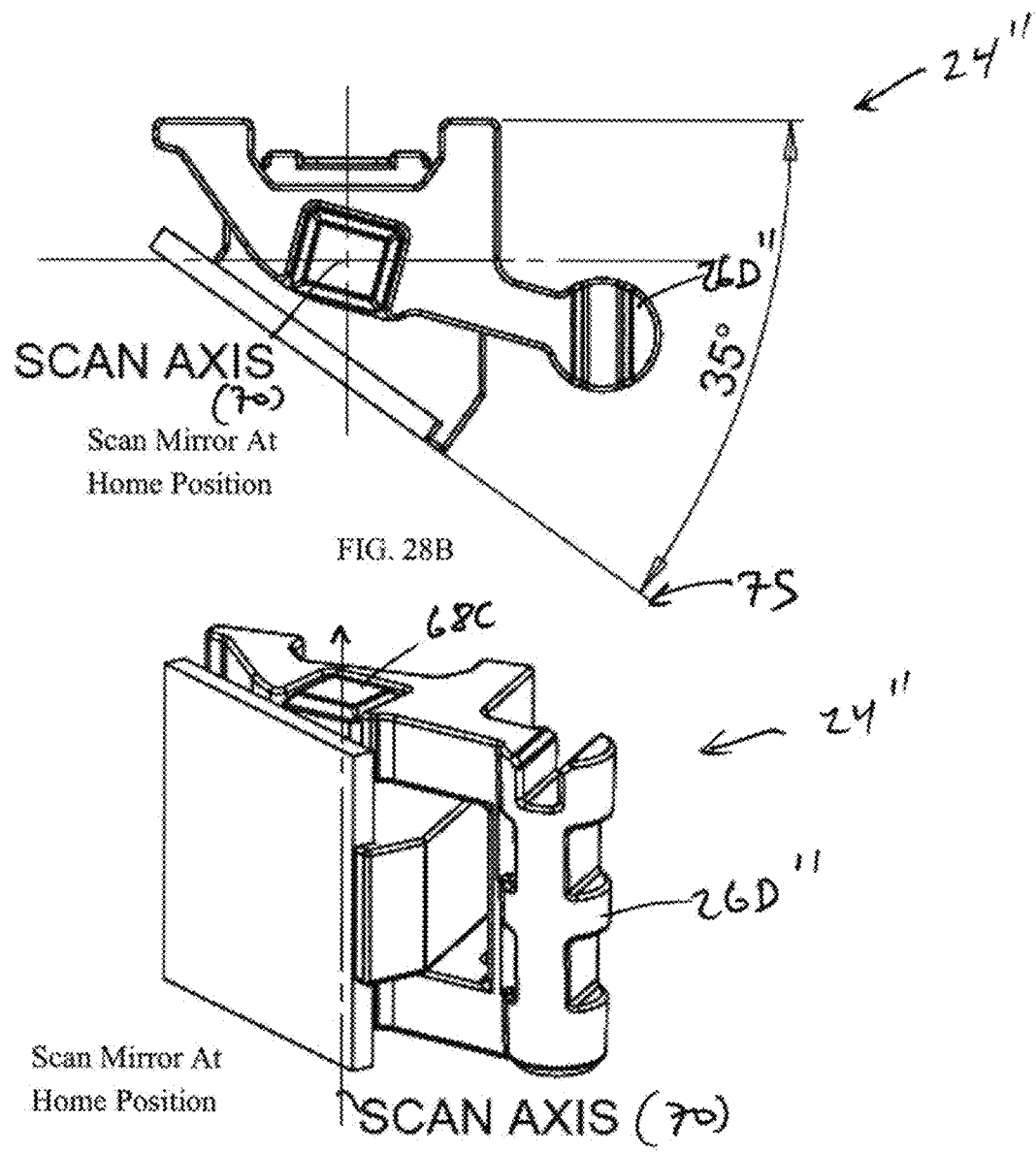
FIG. 28A is a perspective view of the laser scanning assembly shown in FIGS. 25A and 25C, with its scan mirror and magnet rotor subassembly configured in its home position about the scan axis of the laser scanning assembly (i.e. 35 degrees from the reference line shown)
FIG. 28B is a plan view of the laser scanning assembly shown in FIG. 28A, indicating the home position of the scan mirror and magnet rotor subassembly about the scan axis of the laser scanning assembly (i.e. 35 degrees from the reference line shown)

FIGS. 28A through 28B illustrates the laser scanning assembly shown in FIGS. 25A and 25C, with its scan mirror and magnet rotor subassembly configured in its home position about the scan axis of the laser scanning assembly (i.e. 35 degrees from the reference line shown). The restoring/returning forces generated by distorted torsional posts 68C and 68D drive the scan mirror and magnet rotor subassembly 25" to this home position 75 during each and every scanning cycle.

Figure 29B:
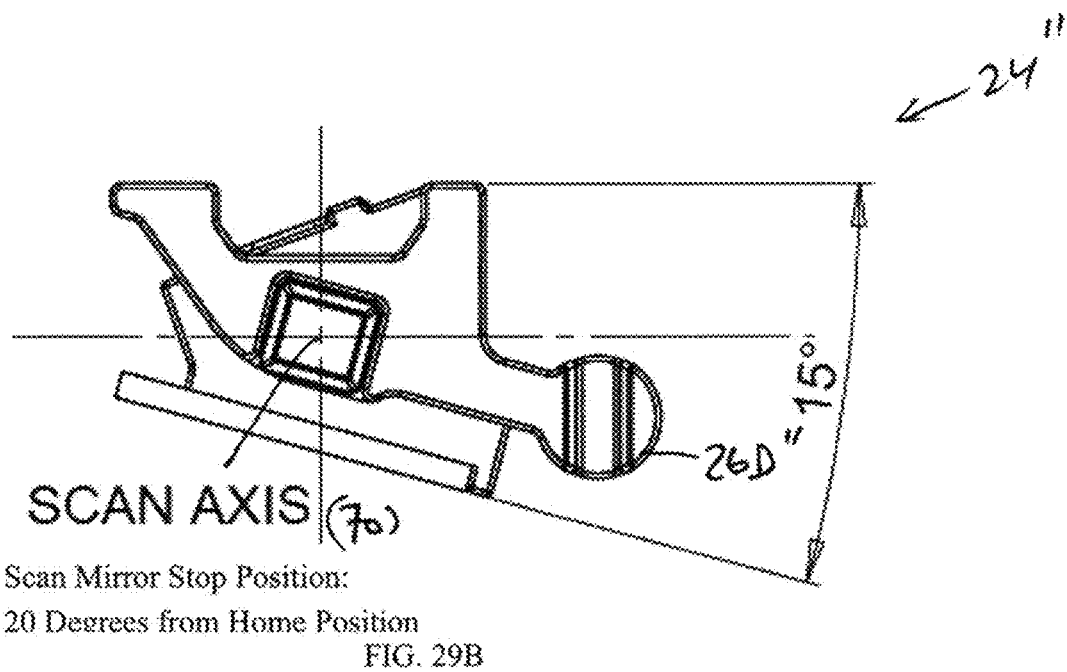
FIG. 29B is a plan view of the laser scanning assembly shown in FIG. 29A, wherein the scan mirror and magnet rotor subassembly is stopped at 20 degrees rotation about the scan axis, from the home position.
Figure 29A:
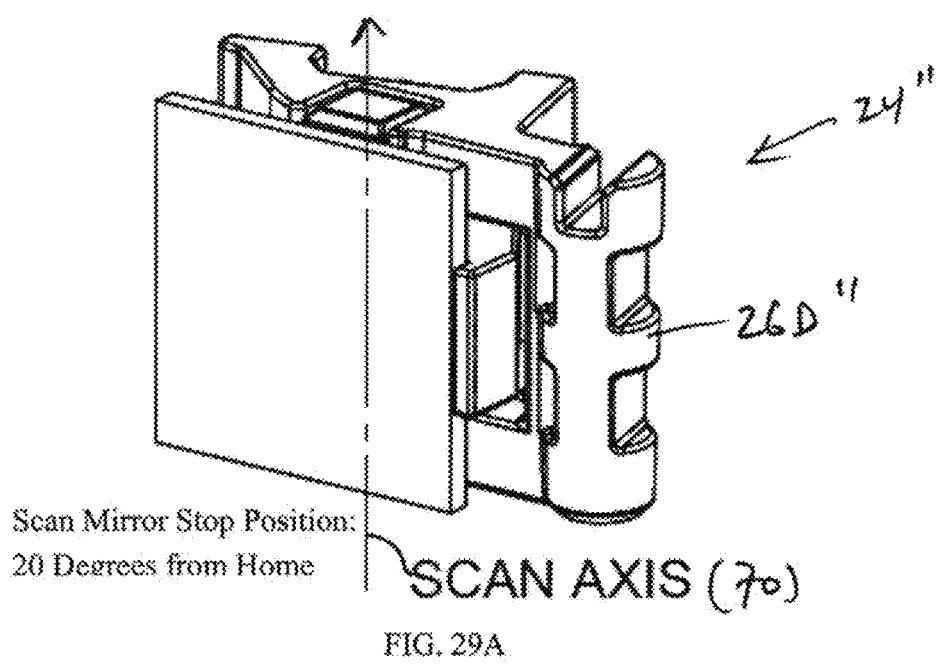
FIG. 29A is a perspective view of the laser scanning assembly of FIG. 25A, rotated 20 degrees about the scan axis from the home position, whereupon the integrated rotation limiting occurs.

FIGS. 29A and 29B illustrate the laser scanning assembly of FIG. 25A, rotated 20 degrees about the scan axis 70 from the home position, in response to magnetic forces generated by the electromagnetic coil structure 29", and exerted against the permanent magnet embedded therewithin, whereupon the integrated rotation limiting occurs, and the scan mirror and magnet rotor subassembly is stopped at 20 degrees rotation about the scan axis, from the home position.

Figure 29C:
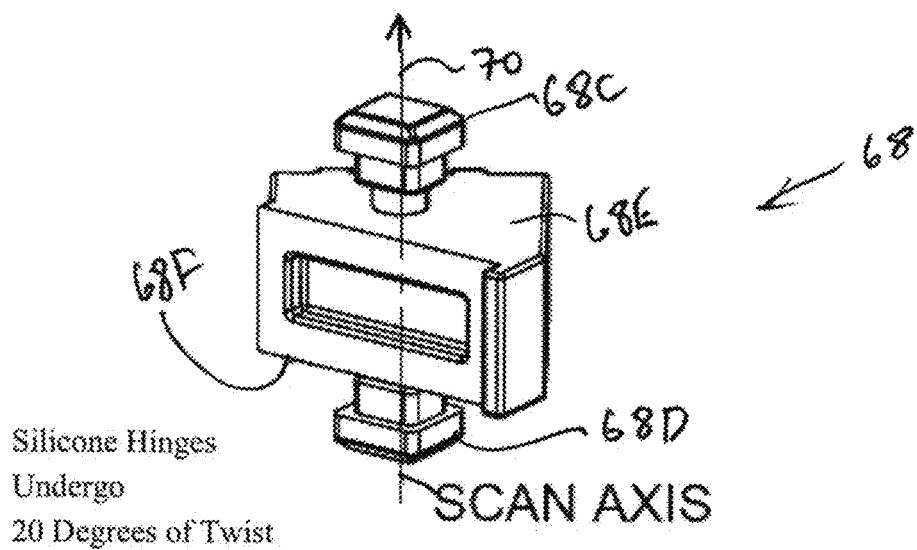
FIG. 29C is a perspective view of the silicone torsionally-distorted frame shown in FIGS. 29A and 29B.
Figure 29D:
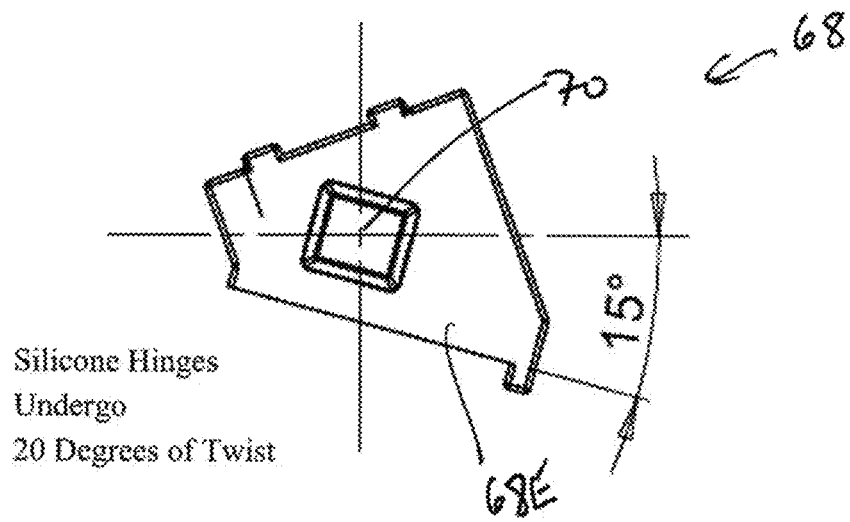
FIG. 29D is a plan view of the silicone torsionally-distorted frame shown in FIG. 29C, wherein silicone hinges have undergone 20 degrees of twist during maximum rotation about the scan axis.

FIGS. 29C and 29D illustrate the silicone torsionally-distorted frame 26" shown in FIGS. 29A and 29B, wherein silicone hinges have undergone 20 degrees of twist during maximum rotation about the scan axis, when stopped by the omnidirectional motion limiting structure 73.

In summary, the design specifications for the second illustrative embodiment are as follows:

(1) the scan mirror 27" is normally located at the 35 degree home position—before being driven by the electromagnet coil 29";

(2) during scanning operations, the scan mirror 27" sweeps a total of 24 degrees about this home position, which implies 12 degrees in the clockwise direction and 12 degrees in the counterclockwise direction;

(3) the integrated rotation-motion limiter 73 and corresponding stop surfaces on the frame holder 26" stop rotation of the rotor in the clockwise direction when the scan mirror rotates 8 degrees beyond its normal 12 degree swing in the clockwise direction (i.e. 12+8=20 degrees); and (4) the integrated rotation limiter 73 and corresponding stop surfaces on the frame holder 26" stop rotation of the rotor in the counter-clockwise direction when the scan mirror rotates 8 degrees beyond it normal 12 degree swing in the counter-clockwise direction (i.e. 12+8=20 degrees).

During this maximum angular swing of 20 degrees, when the rotor subassembly 25" stop(s) hits or strikes corresponding stop surface on the stator structure 26". The silicone torsional hinges 68E, 68F will have undergone 20 degrees of twist-type distortion, and automatically generate a linear rotor restoring force which acts to return the scan mirror and magnet rotor subassembly 25" back to the "home" position. Specification of the Omni-Directional Motion Limiting Structures Integrated within the Laser Scanning Assembly of Second Illustrative Embodiment FIG. 29E illustrates the laser scanning assembly of FIG. 25A, with its scan mirror and magnet rotor subassembly rotated to an extreme clockwise position, and showing the integrated motion limiter 73B striking the thermoplastic frame holder 25", and limiting the rotation of the scan mirror and magnet rotor subassembly, to the position shown in FIG. 29B.

FIG. 29F illustrates the laser scanning assembly of FIG. 25A, configured with its scan mirror and magnet rotor subassembly 25" rotated to an extreme counter-clockwise position, and showing the integrated motion limiter 73A striking the thermoplastic frame holder 26", and limiting the rotation of the scan mirror and magnet rotor subassembly, to the position shown in FIG. 29B.

When configured in these two extreme rotational positions, the silicone torsional hinges 26E" and 26F" elastically distorted, as shown in FIGS. 29C and 29D, and generate restoring or returning forces that are linear with respect to angle of rotation.

FIGS. 30A through 30C illustrate the laser scanning assembly of FIG. 25A, subjected to external shock forces exceeding a particular threshold, and showing the displacement of the scan mirror and magnet rotor subassembly along the x axis direction, and limited by the integrated motion limiters 73B contacting the stop projections/projections 26H1" 26H3" on the thermoplastic frame holder 26", as best shown in FIG. 30C. FIGS. 30D and 30E is a perspective view of the silicone torsionally-supported frame 68 in the configured laser scanning assembly of FIGS. 30A through 30C, showing the limited displacement of the silicone torsional hinges 68C, 68D along the x axis direction.

FIGS. 31A through 31C illustrate the laser scanning assembly of FIG. 25A, subjected to external shock forces exceeding a particular threshold, and showing the displacement of the scan mirror and magnet rotor subassembly along the y axis direction, and limited by the integrated motion limiters (i.e. silicone frame) 68E contacting the upper portion 26F" of the thermoplastic frame holder 68, as shown. FIG. 31D illustrates the silicone torsionally-supported frame in the configured laser scanning assembly of FIGS. 31A through 31C, showing the limited displacement of the silicone torsional hinges 68C, 68D along the y axis direction.

FIGS. 32A through 32C illustrate the laser scanning assembly of FIG. 25A, subjected to external shock forces exceeding a particular threshold, and showing the displacement of the scan mirror and magnet rotor subassembly along the z axis direction, and limited by the integrated motion limiter 73C, 76D contacting the thermoplastic frame holder 26 at frame surfaces 26H5" and 26H6", as shown in FIG. 32C. FIGS. 32D and 32E illustrate the silicone torsionally-supported frame 26" in the configured laser scanning assembly of FIGS. 32A through 32C, showing the limited displacement of the silicone torsional hinges 26C" and 26D" along the z axis direction.

All components of the laser scanning assembly, except for the magnet 28", elastomeric frame element 26", and electromagnetic coil windings 71A, 71B can be a molded as thermoplastic parts using suitable thermoplastic material (e.g. polycarbonate, acrylonitrile butadiene styrene, and/or synthetic polymers known generically as polyamides, etc). The permanent magnet 28" can be realized using Neodymium Iron Boron Type N50 magnetic material, or similar material. The elastomeric hinge element 55 can be injection molded from a LSR (Liquid Silicone Rubber) material, such as Momentive Performance #2030 Silicone or Shin-Etsu KE2090-30AB Select Hesive with enhanced adhesive properties. The layer of adhesive can be a Dow Corning 734 adhesive, or similar material, and the primer layer could be a GE SS4004P or similar material.

In the second illustrative embodiment described above, the torsional posts 26C" and 26D" are shown snap-fit onto the apertures 26D" and 26E", respectively, formed in the thermoplastic frame holder 26. It is understood, however, that these torsional, silicone hinged elements 26C" and 26D" can be over-molded about the top and bottom portion of the thermoplastic frame holder. With this technique, it is possible to increase the stability of the scan element and improve the ease of assembly. Also, it is expected that the performance of an over-molded, torsional, silicone scan rotor 25" should degrade more gracefully over time, as it is less susceptible to outside contaminants and environmental conditions. The over-molded, torsional, silicone hinges (i.e. posts) 26E" and 26F" will return the silicone frame rotor subassembly 25" to a "home position" when at rest. This "return to home" feature is essential to maintaining a stable scan line during scanner operation. By over-molding the silicone torsional posts about the thermoplastic frame holder, it is expected that part-to-part variation will be minimized by eliminating operator variation, and this will result in a more consistent scan line. The inherent properties of silicone will allow for a smoothly operating scanning mechanism that will see minimal performance degradation over time.

Modifications that Come to Mind

Having described the illustrative embodiments, several variations and modifications readily come to mind.

In the illustrative embodiments, the laser scanning modules has been shown to have the form factor of parallel-piped shaped engines, where opposite sides are generally parallel to each other. It is understood, however, that in alternative embodiments, the laser scanning module of the present disclosure can have non-parallel-piped form factors (e.g. cylindrical-shaped, drum shaped, oval-shaped, arbitrary-shaped 3D modules). Also, the laser scanning assemblies of the present disclosure can be installed in all kinds of code symbol reading systems without the use of module or engine housings, and can be realized directly on optical benches, PC boards, and numerous other environments.

It is understood that the laser scanning assembly of the illustrative embodiments may be modified in a variety of ways which will become readily apparent to those skilled in the art in view of the novel teachings disclosed herein. All such modifications and variations of the illustrative embodiments thereof shall be deemed to be within the scope of the claims appended hereto.

What is claimed is:

1. A laser scanning assembly for installation within a housing, said laser scanning assembly comprising:
   a scan mirror and magnet rotor subassembly having
      a silicone frame having a pair of silicone torsional hinges aligned along a scan axis passing through said silicone frame;
      a scan mirror mounted on said silicone frame; and
      a permanent magnet mounted on said silicone frame; and
   a stator structure mounted stationary relative to a housing, and including a frame holder having
   a support member for supporting said frame holder within said housing;
   a pair of support elements provided on said frame holder, so that said pair of silicone torsional hinges are mounted to said support elements along the scan axis, and torsionally support said scan mirror and magnet rotor subassembly and allow said scan mirror and magnet rotor assembly to oscillate freely about said scan axis passing through said silicone torsional hinges and said support elements; and
   an omni-directional rotor motion limiting arrangement for limiting rotational and translational motion of said scan mirror and magnet rotor subassembly, when said laser scanning assembly is subjected to external shock forces exceeding a predetermined threshold.

2. The laser scanning assembly of claim 1, wherein said pair of silicone torsional hinges generate an elastic returning force to said scan mirror and magnet rotor subassembly, the magnitude of which is linearly proportional to the magnitude of the angle of rotation of said scan mirror and magnet rotor subassembly about said scan axis.

3. The laser scanning assembly of claim 2, wherein said silicone frame has a top end and a bottom end, and wherein said omni-directional rotor motion limiting arrangement comprises a pair of stops formed on the top and bottom ends of said silicone frame.

4. The laser scanning assembly of claim 3, wherein said omni-directional rotor motion limiting arrangement further comprises projections extending from said support elements, and wherein said projections strike said pair of stops when said scan mirror and magnet rotor subassembly is subject to said external shock forces, thereby limiting the angular rotational displacement that said scan mirror and magnet rotor subassembly.

5. The laser scanning assembly of claim 4, wherein said silicone frame has a top surface and a bottom surface; wherein said omni-directional rotor motion limiting arrangement further comprises said top and bottom surfaces; and wherein said support element strike said top and bottom surfaces of said silicone frame when said scan mirror and magnet rotor subassembly is subjected to said external shock forces, thereby limiting the linear displacement of said scan mirror and magnet rotor subassembly along a first coordinate direction parallel with said scan axis.

6. The laser scanning assembly of claim 5, wherein said silicone frame has a front surface and a rear surface, and said frame holder has a front surface; wherein said omni-directional rotor motion limiting arrangement further comprises said rear surface of said silicone frame; and wherein said rear surface of said silicone frame strikes the front surface of said frame holder when said laser scanning assembly is subject to external shock forces exceeding said particular threshold, thereby limiting the linear displacement of said scan mirror and magnet rotor subassembly along a second coordinate axis, orthogonal to the front surface of said frame holder, in response to said external shock forces.

7. The laser scanning assembly of claim 6, wherein said omni-directional rotor motion limiting arrangement further comprises said pair of stops on the top and bottom ends of said silicone frame; and wherein said pair of stops strike said projections on said support elements of said frame holder when said laser scanning assembly is subjected to external shock forces exceeding said particular threshold, thereby limiting the linear displacement of said scan mirror and magnet rotor subassembly along a third coordinate axis, orthogonal to said scan axis and parallel the front surface of said frame holder, in response to said external shock forces.

8. The laser scanning assembly of claim 3, wherein said omni-directional rotor motion limiting arrangement comprises:
   a set of stop projections and/or stop surfaces on the rear surface of said stator structure; and
   a plate structure mounted over said magnet and having a first pair of projections formed along a first axis for engaging with one or more of said stop projections and/or stop surfaces on said stator structure, thereby limiting the rotational displacement of said scan mirror and magnet rotor subassembly about said scan axis, when said laser scanning assembly is subjected to external shock forces exceeding said predetermined threshold.

9. The laser scanning assembly of claim 8, wherein said plate structure further comprises a second pair of projections formed along a second axis, orthogonal to said first axis, and wherein said second pair of projections strike one or more of said stop projections and/or stop surfaces on said stator structure, thereby limiting the linear displacement of said scan mirror and magnet rotor subassembly along a first coordinate direction orthogonal with said scan axis, in response to said external shock forces.

10. The laser scanning assembly of claim 9, wherein said frame holder has an opening with a top opening surface and a bottom opening surface, wherein said omni-directional rotor motion limiting arrangement further comprises said top opening surface of said silicone frame; and wherein said top opening surface strikes said top opening surface of said opening on said stator structure and/or said bottom opening surface of said silicone frame strikes said bottom opening surface of said opening on said stator structure, when said laser scanning assembly is subject to external shock forces exceeding said particular threshold, thereby limiting the linear displacement of said scan mirror and magnet rotor subassembly along a second coordinate axis, parallel to said scan axis.

11. The laser scanning assembly of claim 10, wherein said omni-directional rotor motion limiting arrangement further comprises said second pair of projections; and wherein said second pair of projections strikes one or more of said stop projections and/or stop surfaces on said stator structure, when said laser scanning assembly is subjected to external shock forces exceeding said particular threshold, thereby limiting the linear displacement of said scan mirror and magnet rotor subassembly along a third coordinate axis, orthogonal to said scan axis and said first and second coordinate axes.

12. The laser scanning assembly of claim 1, wherein said silicone frame is molded from a liquid silicone rubber.

13. The laser scanning assembly of claim 1, wherein said pair of torsional hinges are realized as torsional posts.

14. The laser scanning assembly of claim 1, wherein pair of said torsional posts has a circular cross-sectional dimension.

15. The laser scanning assembly of claim 1, wherein pair of said torsional posts has a rectangular cross-sectional dimension.

16. The laser scanning assembly of claim 1, wherein each said support element has an aperture formed therein, and said pair of silicone torsional hinges are mounted through said apertures formed in said support elements.

17. The laser scanning assembly of claim 1, wherein said support member has a support portion which is mounted within a recess formed in said housing.

18. The laser scanning assembly of claim 1, wherein said first side and said second side of said silicone frame reside on the same side of said scan axis passing through said silicone frame.

19. A laser scanning module comprising said laser scanning assembly of claim 1.

20. A code symbol reading system comprising:
a system housing with a light transmission aperture; and
a laser scanning assembly according to claim 1 mounted in said system housing.

21. A code symbol reading system comprising:
a system housing with a light transmission aperture; and
a laser scanning module according to claim 19 mounted in said system housing.

22. A laser scanning assembly for installation within a scanning system having a system housing, said laser scanning assembly comprising:
a scan mirror and magnet rotor subassembly having
an elastomeric frame having a pair of elastomeric torsional hinges aligned along a scan axis passing through said elastomeric one frame;
a scan mirror mounted on said elastomeric frame; and
a permanent magnet mounted on said elastomeric frame; and
a stator structure mounted stationary relative to said system housing, and including a frame holder having
a support member for supporting said frame holder within said system housing, and
support elements provided on said frame holder, so that said pair of elastomeric torsional hinges are mounted to said support elements along the scan axis, and torsionally support said scan mirror and magnet rotor subassembly and allow said scan mirror and magnet rotor assembly to oscillate freely about said scan axis passing through said elastomeric torsional hinges and said support elements;
wherein said pair of elastomeric torsional hinges generate an elastic returning force to said scan mirror and magnet rotor subassembly, the magnitude of which is linearly proportional to the magnitude of the angle of rotation of said scan mirror and magnet rotor subassembly about said scan axis.

* * * * *